(12) United States Patent
Kaneshiro et al.

(10) Patent No.: US 10,863,228 B2
(45) Date of Patent: Dec. 8, 2020

(54) CONTROLLER

(71) Applicant: Panasonic Intellectual Property Management Co., Ltd., Osaka (JP)

(72) Inventors: Norikazu Kaneshiro, Osaka (JP); Yutaka Higurashi, Osaka (JP); Hiroki Urabe, Osaka (JP); Tsukasa Takahashi, Hyogo (JP); Makoto Sekitoh, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 145 days.

(21) Appl. No.: 16/087,150

(22) PCT Filed: Mar. 28, 2017

(86) PCT No.: PCT/JP2017/012592
§ 371 (c)(1),
(2) Date: Sep. 21, 2018

(87) PCT Pub. No.: WO2017/170520
PCT Pub. Date: Oct. 5, 2017

(65) Prior Publication Data
US 2019/0098247 A1 Mar. 28, 2019

(30) Foreign Application Priority Data

Mar. 30, 2016 (JP) .................................. 2016-069420
Mar. 6, 2017 (JP) .................................. 2017-042232

(51) Int. Cl.
*H04N 5/44* (2011.01)
*H04N 21/422* (2011.01)
(Continued)

(52) U.S. Cl.
CPC ........ *H04N 21/42204* (2013.01); *H01H 9/18* (2013.01); *H04N 21/422* (2013.01);
(Continued)

(58) Field of Classification Search
CPC ............... H04N 5/4403; H04N 21/422; H04N 2005/4412; H04N 2005/4416;
(Continued)

(56) References Cited

U.S. PATENT DOCUMENTS 5,579,002 A * 11/1996 Iggulden .............. H03K 17/967
341/23
5,729,222 A * 3/1998 Iggulden ............ H03K 17/9631
341/31
(Continued)

FOREIGN PATENT DOCUMENTS

| JP | 2-100597 | 4/1990 |
|---|---|---|
| JP | 2009-017086 | 1/2009 |
| WO | 1994/028634 A1 | 12/1994 |

OTHER PUBLICATIONS

International Search Report of PCT application No. PCT/JP2017/012592 dated Jun. 27, 2017.
(Continued)

*Primary Examiner* — Thomas D Alunkal
(74) *Attorney, Agent, or Firm* — McDermott Will & Emery LLP

(57) ABSTRACT

A control device includes: an output unit that outputs a signal for prompting an electronic device to execute a predetermined operation; a function switch unit that includes a plurality of switches each having a contactor formed such that at least a portion of the contactor is elastically displaceable in a predetermined direction; and a label body that has a display part and a protruding part protruding from the display part, the label body being mounted in a state where
(Continued)

the protruding part is inserted into a hole in a housing and the display part is positioned on an outside of the housing. The protruding part of the label body determines a combination of open or closed states of the plurality of switches. The predetermined operation is determined according to the combination.

9 Claims, 26 Drawing Sheets

(51) Int. Cl.
 *H04Q 9/00* (2006.01)
 *H01H 9/18* (2006.01)
(52) U.S. Cl.
 CPC ......... *H04Q 9/00* (2013.01); *H01H 2203/018* (2013.01); *H01H 2221/034* (2013.01); *H01H 2239/026* (2013.01); *H04N 21/4221* (2013.01); *H04N 21/42212* (2013.01); *H04N 21/42227* (2013.01)
(58) Field of Classification Search
 CPC ............. H04N 2005/4439; H01H 9/18; H01H 2203/018; H01H 2221/034; H01H 2239/026; H04Q 9/00
 See application file for complete search history.

(56) References Cited

U.S. PATENT DOCUMENTS

| | | | |
|---|---|---|---|
| 5,831,555 A * | 11/1998 | Yu | H03M 11/02 341/26 |
| 10,217,577 B2 * | 2/2019 | Strauss | G08C 17/02 |
| 2013/0076542 A1 * | 3/2013 | Tanaka | G06F 3/02 341/22 |
| 2014/0346026 A1 * | 11/2014 | Sakashita | H01H 3/26 200/518 |
| 2019/0198269 A1 * | 6/2019 | Teng | H01H 13/83 |

OTHER PUBLICATIONS

The Extended European Search Report dated Feb. 21, 2019 for the related European Patent Application No. 17775057.7.

\* cited by examiner

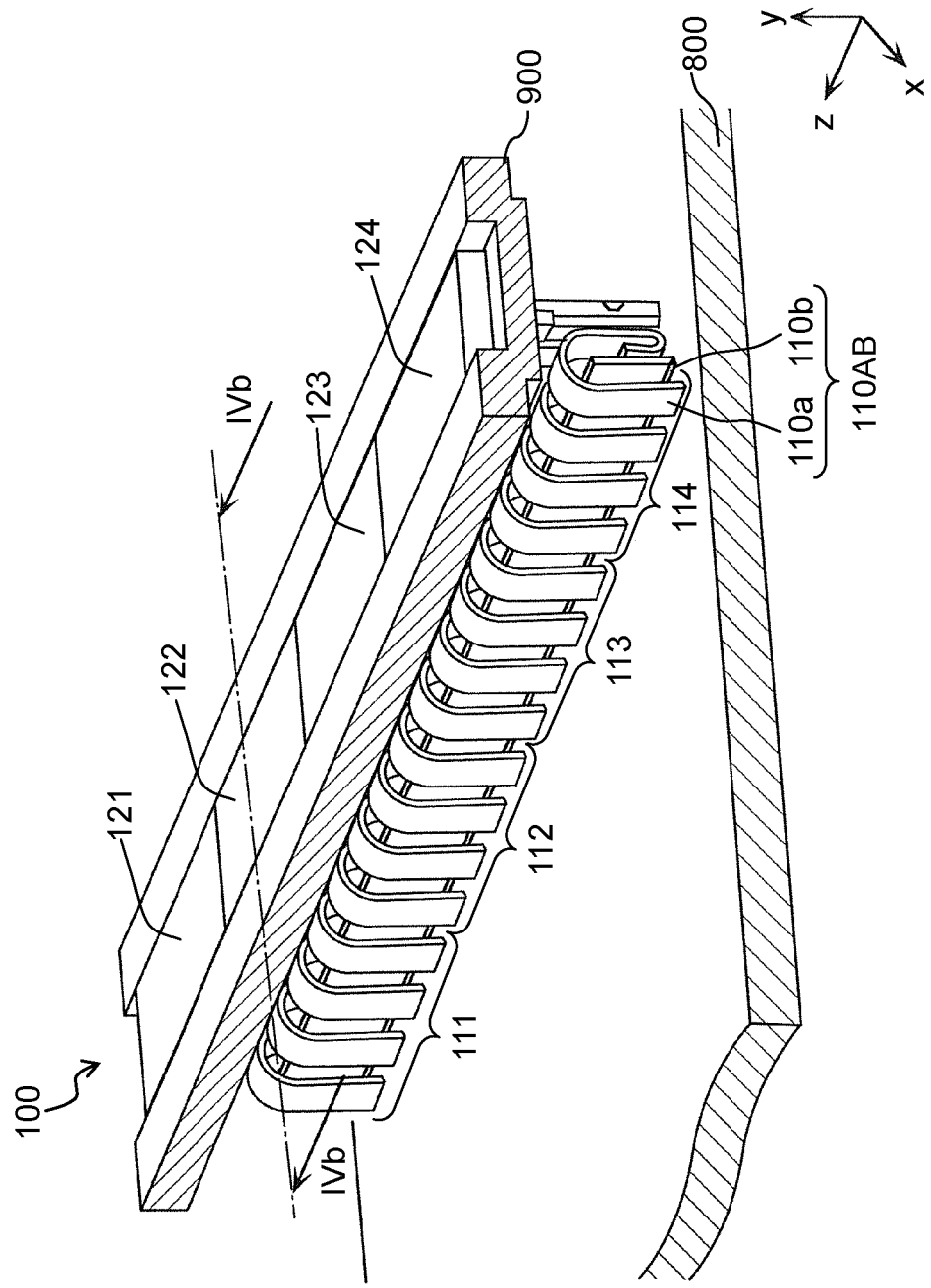

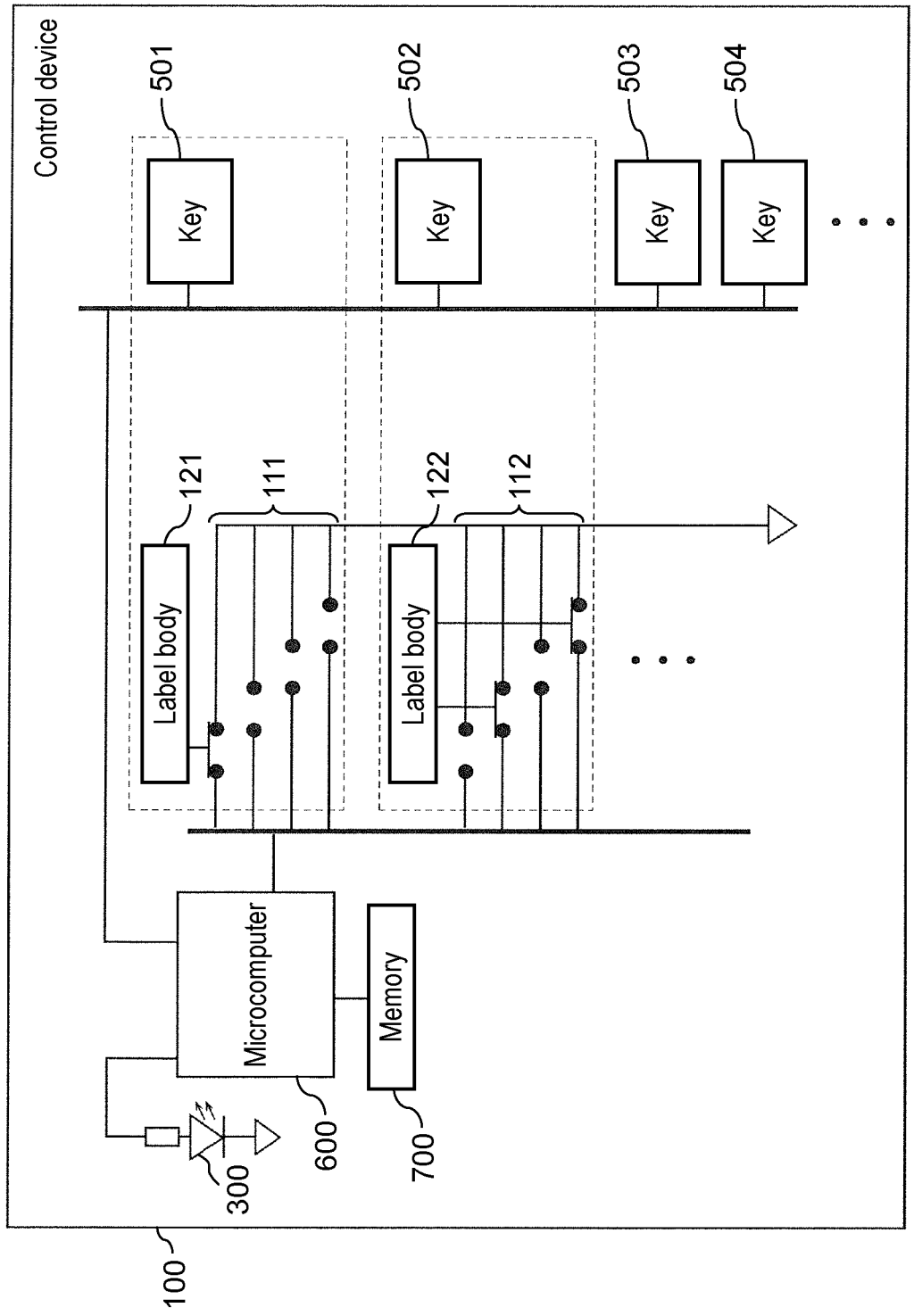

CONTROLLER

This application is a U.S. national stage application of the PCT International Application No. PCT/JP2017/012592 filed on Mar. 28, 2017, which claims the benefit of foreign priority of Japanese patent applications No. 2016-069420 filed on Mar. 30, 2016 and No. 2017-042232 filed on Mar. 6, 2017, the contents all of which are incorporated herein by reference.

TECHNICAL FIELD

The present disclosure relates to a control device for controlling an electronic device.

BACKGROUND ART

PTL 1 discloses a learning remote control apparatus adapted to control a plurality of devices. This learning remote control apparatus has a function name display part. In this learning remote control apparatus, a function assigned to each key as a result of previous learning is displayed on the function name display part according to an electronic device to be controlled which is designated by a user during operation.

PTL 2 discloses a remote control apparatus in which a key layout can be changed. In this remote control device, each key has transmission code specifying information. When a certain key is operated by a user, the remote control device reads the transmission code specifying information of this key. The remote control device then generates a transmission code corresponding to the transmission code specifying information which has been read, and transmits the transmission code to a target device.

CITATION LIST

Patent Literature

PTL 1: Unexamined Japanese Patent Publication No. H02-100597
PTL 2: Unexamined Japanese Patent Publication No. 2009-17086

SUMMARY

The present disclosure provides a control device with which it is possible to easily customize an assignment of functions to an operation unit such as a key.

A control device for controlling an electronic device according to the present disclosure includes: an output unit that outputs a signal for prompting the electronic device to execute a predetermined operation; a function switch unit that includes a plurality of switches each having a contactor formed such that at least a portion of the contactor is elastically displaceable in a predetermined direction, the switches each being switched between an open state and a closed state due to displacement of the at least a portion of the contactor in the predetermined direction; and a label body that has a display part and a protruding part protruding from the display part, the label body being mounted in a state where the protruding part is inserted into a hole in a housing and the display part is positioned on an outside of the housing. The protruding part of the label body determines a combination of open or closed states of the plurality of switches switched when the protruding part presses and displaces at least one of the contactors of the plurality of switches in the predetermined direction. The predetermined operation is determined according to the combination.

The control device according to the present disclosure makes it possible to easily customize an assignment of functions to an operation unit such as a key.

BRIEF DESCRIPTION OF DRAWINGS

FIG. 2 is a perspective view schematically illustrating one example of a part of a control device included in a control apparatus according to a first exemplary embodiment.

FIG. 5 is a block diagram illustrating an example of a configuration of the control device according to the first exemplary embodiment.

DESCRIPTION OF EMBODIMENTS

Exemplary embodiments will be described in detail below with reference to the drawings as appropriate. However, detailed descriptions that are more than necessary may be omitted. For example, detailed descriptions of already known items and duplicated descriptions of substantially identical configurations might sometimes be omitted. Such omissions are for preventing following description from becoming redundant more than necessary, and for helping those skilled in the art easily understand the following description.

Note that the attached drawings and the following description are provided for those skilled in the art to fully understand the present disclosure, and are not intended to limit the subject matter as described in the appended claims.

It should be noted that each of the diagrams is schematic, and is not necessarily strictly accurate. Further, in the respective drawings, substantially identical components are denoted by identical reference marks, and descriptions of those components may be omitted or simplified.

Exemplary embodiments of a control device according to the present disclosure will be described below with reference to FIGS. 1A to 20. In the exemplary embodiments below, a face provided with keys in a control apparatus having the control device according to the present disclosure is referred to as an upper surface, and a face on the opposite side of the control apparatus from the face provided with keys is referred to as a bottom surface or a back surface. In the respective drawings, three axes which are an x axis, a y axis, and a z axis are shown. A long direction of the control apparatus is defined as the x axis, a short direction of the control apparatus is defined as the z axis, and a direction orthogonal to the x axis and the z axis is defined as the y axis. However, these axes and directions are shown only for convenience, and do not limit at all the present disclosure.

(Outline)

Figure 1A:
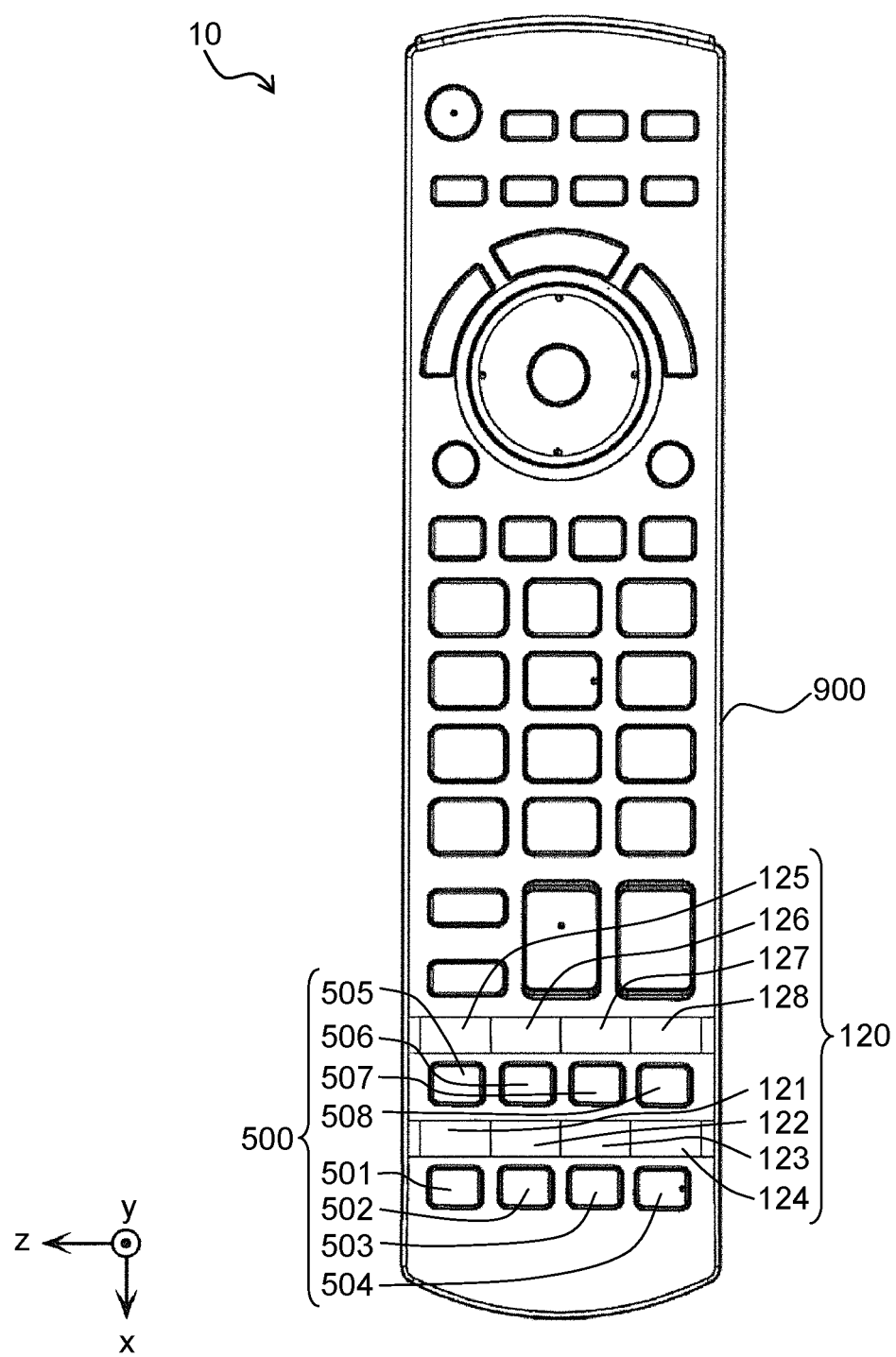
FIG. 1A is a plan view schematically illustrating one example of an appearance of a control apparatus including a control device according to the present disclosure.
Figure 1B:
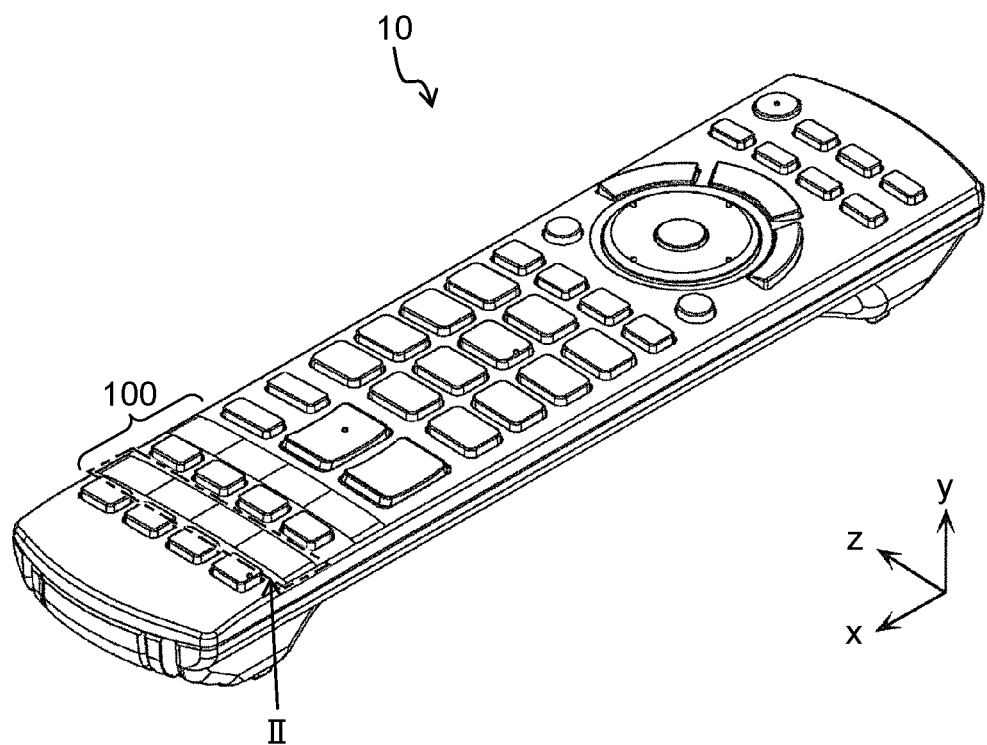
FIG. 1B is a perspective view schematically illustrating one example of the appearance of the control apparatus including the control device according to the present disclosure.

FIG. 1A is a plan view schematically illustrating one example of an appearance of control apparatus 10 including the control device according to the present disclosure. FIG. 1B is a perspective view schematically illustrating one example of the appearance of control apparatus 10 including control device 100 according to the present disclosure.

Control apparatus 10 illustrated in FIGS. 1A and 1B is an apparatus for wirelessly controlling an electronic device which can be wirelessly controlled. Control apparatus 10 is specifically a remote controller for wirelessly controlling a television receiver (hereinafter also referred to as a "TV receiver").

On an outer appearance of control apparatus 10 including control device 100 according to the present disclosure, only surfaces of keys 501 to 508 and label bodies 121 to 128, each of which is one of components of control device 100, are exposed as illustrated in FIGS. 1A and 1B. Hereinbelow, all of or some of keys 501 to 508 may be collectively or interchangeably referred to as key 500. In addition, all of or some of label bodies 121 to 128 may be collectively or interchangeably referred to as label body 120.

Key 500 is one example of an operation unit that is operated by a user to wirelessly control an electronic device to be controlled. In this example, the user presses key 500 for wirelessly controlling the TV receiver.

A display (not illustrated in FIGS. 1A and 1B) indicating an operation executed by the electronic device to be controlled is provided on the surface of each label body 120 by means of printing or relief (for example, embossing) according to an operation (depression of key 500) performed by the user on key 500 corresponding to a mounting position of each label body 120. This display is formed by using characters, symbols, graphics, or a combination thereof, for example.

One specific example will be described with reference to FIG. 1A. In the example illustrated in FIG. 1A, the mounting position of label body 121 corresponds to key 501, and the display (characters or symbols, for example) indicating an operation (for example, display of an internet connection screen) that control apparatus 10 prompts the TV receiver to execute in response to the depression of key 501 is provided on the surface of label body 121. The mounting position of label body 122 corresponds to key 502, and the display (characters or symbols, for example) indicating an operation (for example, an audio switching feature for selectively switching between a main audio program and a second audio program) that control apparatus 10 prompts the TV receiver to execute in response to the depression of key 502 is provided on the surface of label body 122. Similarly, the mounting positions of label bodies 123 to 128 respectively correspond to keys 503 to 508, and the display (characters or symbols, for example) indicating an operation that control apparatus 10 prompts the TV receiver to execute in response to the depression of each of keys 503 to 508 is provided on the surface of each of label bodies 123 to 128.

In control device 100 according to the present disclosure, label body 120 is detachable from a housing of control apparatus 10, and the mounting positions of label bodies 120 can be exchanged for one another. Due to the exchange of the mounting positions of label bodies 120 for one another, operations that control apparatus 10 prompts the TV receiver to execute in response to the depression of keys 500 corresponding to label bodies 120 are exchanged between keys 500.

For example, if the mounting position of label body 121 and the mounting position of label body 125 are exchanged for one another, the operation that control apparatus 10 prompts the TV receiver to execute in response to the depression of key 501 corresponding to label body 121 and the operation that control apparatus 10 prompts the TV receiver to execute in response to the depression of key 505 corresponding to label body 125 are exchanged for one another.

In addition, another label body (referred to as label body 129) not illustrated may be exchanged for any one of label bodies 121 to 128 and mounted to control device 100 in the present disclosure. Thus, an operation (a new operation that control apparatus 10 cannot prompt the electronic device to be controlled to execute even when any one of keys 501 to 508 is pressed) which has not been assigned to any of keys 501 to 508 before the exchange can be assigned to key 500 corresponding to label body 129.

For example, it is supposed that control apparatus 10 belongs to a TV receiver having a function of displaying a Web page, and in an initial state of control apparatus 10 (that is, before any one of label bodies 121 to 128 is exchanged for label body 129), keys 501 to 508 are all assigned to control broadcast reception of the TV receiver or to control a video recorder connected to the TV receiver. When, in such a case, label body 121 is removed from control apparatus 10 and label body 129 is attached in place of label body 121, for example, another operation (for example, an operation for displaying a specific website on the TV receiver when key 501 is depressed) which cannot be executed in the initial state can be assigned to key 501 corresponding to label body 121.

In this way, in control device 100 according to the present disclosure, a function of the operation unit corresponding to label body 120 can be changed by exchanging label bodies 120 for one another or by exchanging label body 120 for a new one. Specifically, control device 100 according to the present disclosure enables a user to easily customize an assignment of functions to the operation unit. In the present disclosure, the wording "easily" means that the user does not need to perform an operation or setting other than the exchange of label bodies 120 when changing the assignment of functions to the operation unit.

Exemplary embodiments of such a control device that enables a user to easily customize an assignment of functions to an operation unit will be described below.

First Exemplary Embodiment

[1-1. Configuration]

A configuration of control device 100 according to a first exemplary embodiment will be described with reference to FIGS. 2 to 5.

FIG. 2 is a view schematically illustrating one example of a part of control device 100 included in control apparatus 10 according to the first exemplary embodiment. FIG. 2 is a perspective view illustrating an area enclosed by a dot-and-dash line in FIG. 1B as viewed in a direction of arrow II.

Figure 3A:
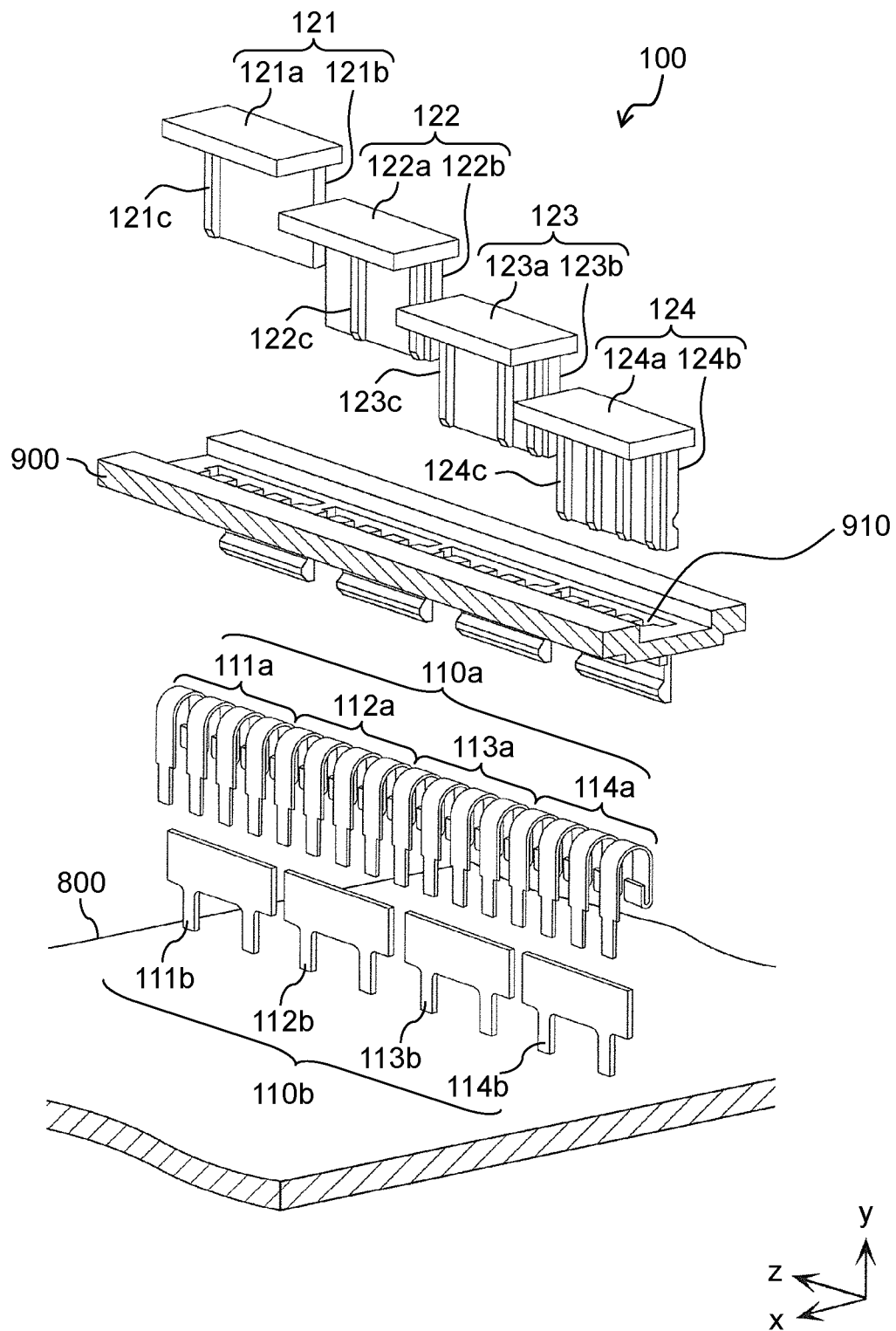
FIG. 3A is an exploded perspective view schematically illustrating a part of the control device illustrated in FIG. 2.
Figure 3B:
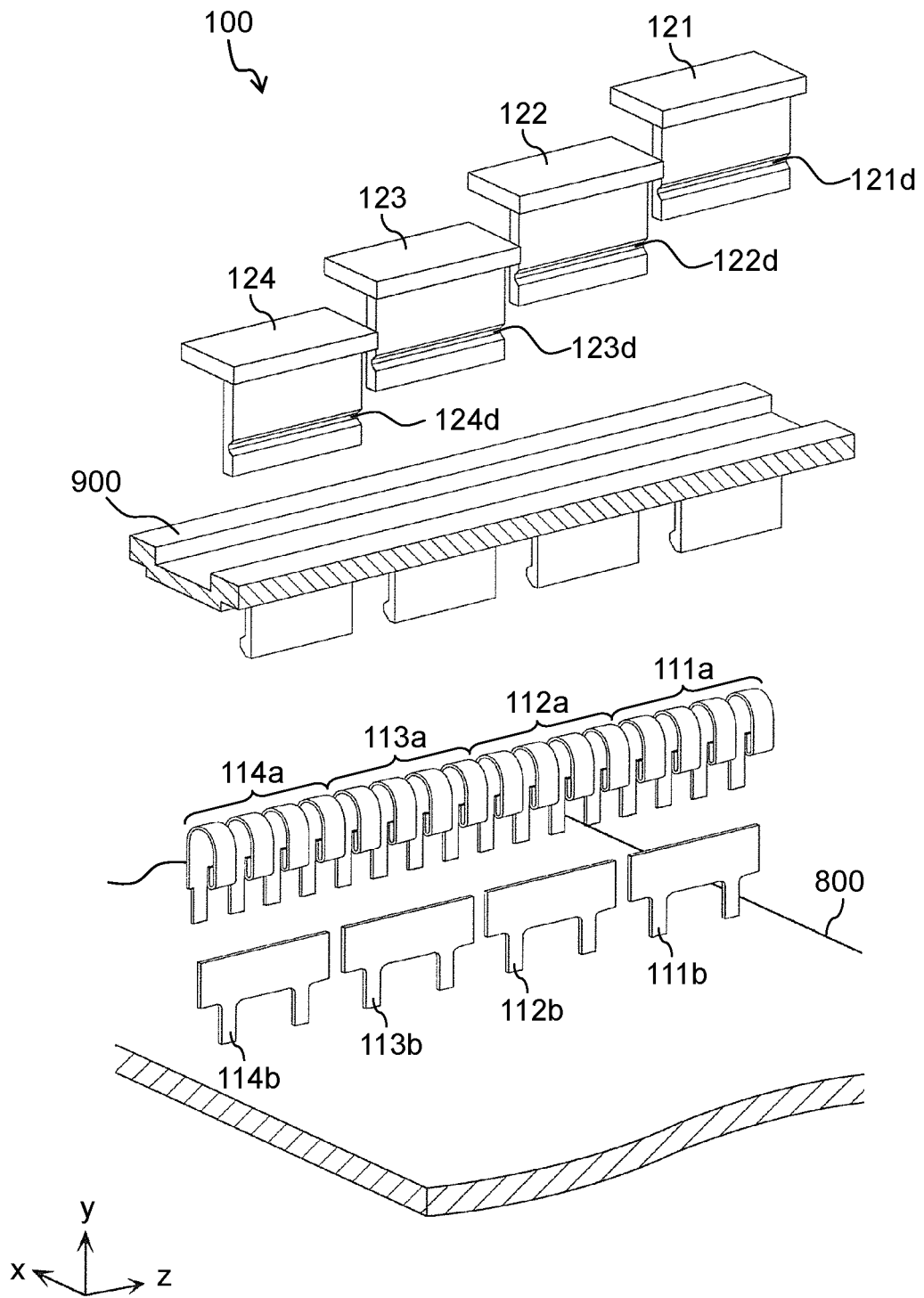
FIG. 3B is an exploded perspective view schematically illustrating a part of the control device illustrated in FIG. 2.

FIGS. 3A and 3B are exploded perspective view schematically illustrating a part of control device 100 illustrated in FIG. 2. FIG. 3A is a view illustrating the area enclosed by the dot-and-dash line in FIG. 1B as viewed in the direction of arrow II (a view of the area as viewed in substantially the same direction in FIG. 2), and FIG. 3B is a view illustrating the area as viewed from a different direction (a direction opposite to the direction in FIG. 3A).

The portion including label bodies 125 to 128 in FIGS. 1A and 1B has a configuration substantially same as the portion including label bodies 121 to 124 described below, and therefore, the illustration and description thereof will be omitted.

Control device 100 includes label bodies 121 to 124 and function switch units 111 to 114. Hereinbelow, all of or some of function switch units 111 to 114 may be collectively or interchangeably referred to as function switch unit 110. Label body 120 is mounted to control device 100 (housing 900) such that the surface thereof is exposed on housing 900 of control apparatus 10. Label body 120 and housing 900 described above are an acrylonitrile butadiene styrene (ABS) resin molding, for example.

Function switch unit 110 includes a plurality of switches 110AB composed of a pair of movable contactor 110a and fixed contactor 110b. Movable contactor 110a and fixed contactor 110b are mounted on substrate 800 of control apparatus 10, respectively. Movable contactor 110a and fixed contactor 110b are respectively formed by molding a conductor such as a metal plate. Movable contactor 110a and fixed contactor 110b are one example of a contactor.

In FIGS. 2 to 3B, sixteen movable contactors 110a and four fixed contactors 110b are illustrated. In the example in FIGS. 2 to 3B, four movable contactors 110a in line in the z axis direction pair up with one fixed contactor 110b. A pair of one movable contactor 110a and one fixed contactor 110b that is shared by four movable contactors 110a constitute one switch 110AB. Thus, four switches 110AB are formed using one fixed contactor 110b. One fixed contactor 110b and four movable contactors 110a which pair up with this fixed contactor 110b to form four switches 110AB constitute one function switch unit 110.

In the description below, to distinguish switches 110AB included in function switch units 111 to 114 from one another, switch 110AB included in function switch unit 111 may be referred to as "switch 111AB", switch 110AB included in function switch unit 112 may be referred to as "switch 112AB", switch 110AB included in function switch unit 113 may be referred to as "switch 113AB", and switch 110AB included in function switch unit 114 may be referred to as "switch 114AB" (see FIGS. 3A and 3B).

In addition, to distinguish movable contactors 110*a* included in function switch units 111 to 114 from one another, movable contactor 110*a* included in function switch unit 111 may be referred to as "movable contactor 111*a*", movable contactor 110*a* included in function switch unit 112 may be referred to as "movable contactor 112*a*", movable contactor 110*a* included in function switch unit 113 may be referred to as "movable contactor 113*a*", and movable contactor 110*a* included in function switch unit 114 may be referred to as "movable contactor 114*a*" (see FIGS. 3A and 3B).

In addition, to distinguish fixed contactors 110*b* included in function switch units 111 to 114 from one another, fixed contactor 110*b* included in function switch unit 111 may be referred to as "fixed contactor 111*b*", fixed contactor 110*b* included in function switch unit 112 may be referred to as "fixed contactor 112*b*", fixed contactor 110*b* included in function switch unit 113 may be referred to as "fixed contactor 113*b*", and fixed contactor 110*b* included in function switch unit 114 may be referred to as "fixed contactor 114*b*" (see FIGS. 3A and 3B).

Movable contactor 110*a* illustrated in FIGS. 3A and 3B is formed by molding a long metal plate into a substantially reversed J shape. Apart of one end of the metal plate in the longitudinal direction is inserted into substrate 800 to be mounted on substrate 800, and the other end of the metal plate in the longitudinal direction is disposed above substrate 800 (in the positive direction of the y axis). The other end of the metal plate of movable contactor 110*a* in the longitudinal direction is a free end. Therefore, if a force in the positive direction of the x axis is applied to the part (hereinafter referred to as a movable part) of the metal plate above substrate 800, the metal plate displaces in this direction. If a displacement amount during the displacement falls within the elasticity range of the metal plate, the movable part returns to the original position when this force is absent.

Fixed contactor 110*b* illustrated in FIGS. 3A and 3B is a metal plate having a plate-shaped part and two legs for mounting fixed contactor 110*b* to substrate 800. Fixed contactor 110*b* is mounted to substrate 800 in an attitude and at a location such that the plate-shaped part fits in the movable parts of a plurality of movable contactors 110*a*. Due to the displacement of the movable part of movable contactor 110*a* as described above, a contact state between movable contactor 110*a* and fixed contactor 110*b* is changed. Thus, switching state (open state or closed state) of switch 110AB is switched. This operation will be described later in detail.

The basic shape and size of label body 120 (label bodies 121 to 124) are substantially the same, and therefore label body 121 will now be described as an example.

As illustrated in FIG. 3A, label body 121 has display part 121*a* and protruding part 121*b*. A surface which is exposed with label body 121 being mounted to housing 900 of control apparatus 10 is a portion of display part 121*a*. Protruding part 121*b* of label body 121 moves in the y axis direction and is inserted into hole 910 formed in housing 900. In this way, label body 121 is mounted to control device 100 (housing 900) with display part 121*a* being positioned on the outside of housing 900. Respective label bodies 121 to 124 have one or more ribs 120*c*, which project in the positive direction of the x axis and have the same shape, on side surfaces of protruding parts 121*b* to 124*b* in the positive direction of the x axis. Respective label bodies 121 to 124 also have recesses 120*d* formed on side surfaces on the opposite side of protruding parts 121*b* to 124*b* from the side surfaces provided with ribs 120*c*.

To distinguish ribs 120*c* included in respective label bodies 121 to 124 from one another, rib 120*c* included in label body 121 may be referred to as "rib 121*c*", rib 120*c* included in label body 122 may be referred to as "rib 122*c*", rib 120*c* included in label body 123 may be referred to as "rib 123*c*", and rib 120*c* included in label body 124 may be referred to as "rib 124*c*".

In addition, to distinguish recesses 120*d* included in respective label bodies 121 to 124 from one another, recess 120*d* included in label body 121 may be referred to as "recess 121*d*", recess 120*d* included in label body 122 may be referred to as "recess 122*d*", recess 120*d* included in label body 123 may be referred to as "recess 123*d*", and recess 120*d* included in label body 124 may be referred to as "recess 124*d*".

As described above, the basic shape and size of label bodies 120 (label bodies 121 to 124) are substantially the same. Therefore, mounting positions of label bodies 121 to 124 on housing 900 can be exchanged for one another. However, a number and arrangement positions of ribs 120*c* projecting on the side surfaces of protruding parts 121*b* to 124*b* in the positive direction of the x axis differ among protruding parts 121*b* to 124*b* as illustrated in FIG. 3A. Specifically, in the present exemplary embodiment, ribs 120*c* on label bodies 121 to 124 differ among label bodies 121 to 124 in number and location where they are formed. In the present exemplary embodiment, the maximum number of ribs 120*c* on each label body 120 is four. However, the maximum number of ribs 120*c* on label body 120 is not limited at all to four. Further, the number of switches 110AB included in function switch unit 112 is not limited at all to four. The number of ribs 120*c* formed on label body 120 may be appropriately set according to the number of switches 110AB included in function switch unit 112.

Each rib 120*c* is formed into a shape and on a location so as to be in contact with the movable part of movable contactor 110*a* facing rib 120*c* and capable of pushing the movable part in a predetermined direction, when each label body 120 is mounted to control device 100 (housing 900). The predetermined direction is a direction perpendicular to the direction in which protruding part 121*b* is inserted, that is, the positive direction of the x axis, in the example in FIG. 3A.

Next, how switch 110AB is changed by the attachment of label body 120 to control device 100 (housing 900) will be described with reference to FIGS. 4A and 4B.

Figure 4A:
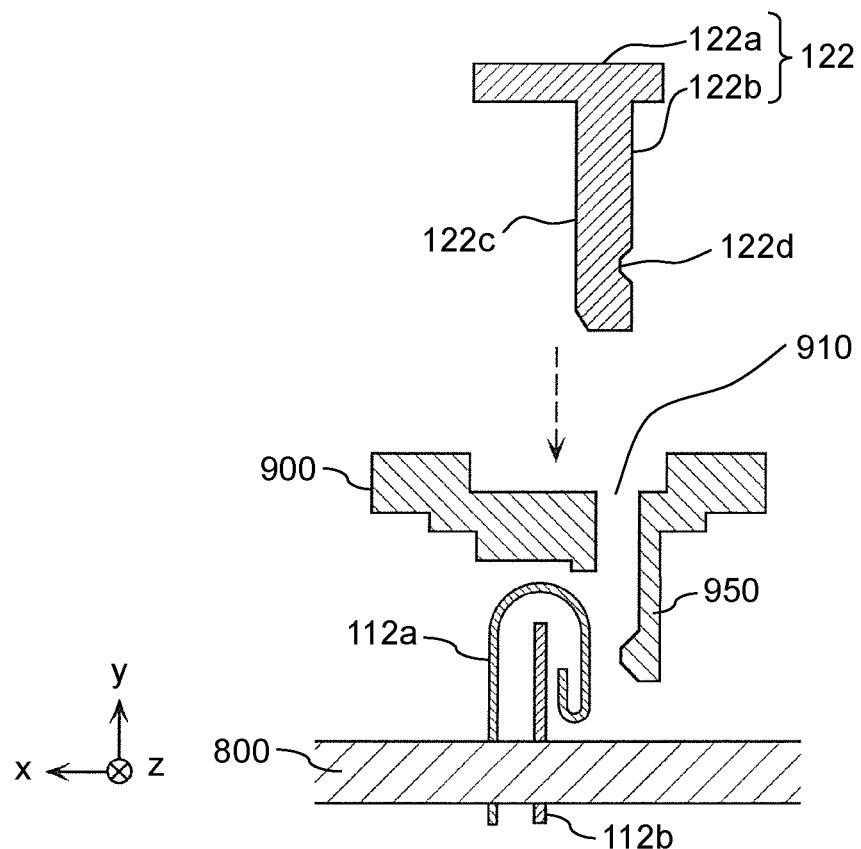
FIG. 4A is a sectional view schematically illustrating one example of a part of the control device included in the control apparatus according to the first exemplary embodiment.
Figure 4B:
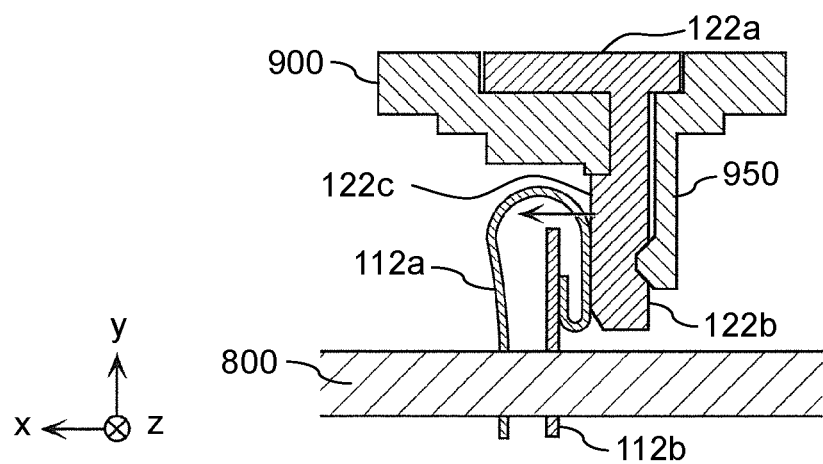
FIG. 4B is a sectional view schematically illustrating one example of a part of the control device included in the control apparatus according to the first exemplary embodiment.

FIGS. 4A and 4B are sectional views schematically illustrating one example of a part of control device 100 included in control apparatus 10 according to the first exemplary embodiment.

FIGS. 4A and 4B are respectively sectional views illustrating a cut surface along line IVb-IVb in FIG. 2. FIG. 4A illustrates a state before label body 120 (label body 122 in the example in FIG. 4A) is mounted to control device 100 (housing 900), and FIG. 4B illustrates a state where label body 120 (label body 122 in the example in FIG. 4B) is mounted to control device 100 (housing 900) as illustrated in FIG. 2.

When label body 122 is not mounted to housing 900, movable contactor 112*a* and fixed contactor 112*b* are not in contact with each other as illustrated in FIG. 4A. In other words, multiple (four, for example) switches 110AB included in function switch unit 112 are all in an open state in an initial state (a state where label body 122 is not mounted to housing 900). Label body 122 is mounted to control device 100 (housing 900) as illustrated in FIG. 4B by inserting protruding part 122*b* into hole 910 in housing 900 in the negative direction of the y axis as indicated by a broken line arrow in FIG. 4A.

When label body 122 is mounted to control device 100 (housing 900), protruding part 122b presses movable contactor 112a in a direction (a direction indicated by a solid arrow in FIG. 4B, the positive direction in the x axis) substantially perpendicular to the insertion direction of protruding part 122b by rib 122c provided on the side surface of protruding part 122b as illustrated in FIG. 4B, thereby displacing the movable part of movable contactor 112a. Due to the displacement, movable contactor 112a and fixed contactor 112b are brought into contact with each other. In other words, switch 110AB composed of movable contactor 112a and fixed contactor 112b is in a closed state.

It is to be noted that, even when label body 122 is mounted to control device 100 (housing 900), a portion of protruding part 122b without having rib 122c does not press movable contactor 112a, and thus, switch 110AB corresponding to this portion remains in an open state. Therefore, in the example illustrated in FIG. 3A, when label body 122 is mounted to control device 100 (housing 900), four switches 110AB included in function switch unit 112 are in an open state, closed state, open state, and closed state in order in the negative direction of the z axis in FIG. 3A.

The size of rib 122c formed on protruding part 122b is set such that an amount of displacement of the movable part of movable contactor 112a by pressure from rib 122c falls within elasticity range of movable contactor 112a. Therefore, when label body 122 is removed from control device 100 (housing 900), the movable part of movable contactor 112a pressed by protruding part 122b returns to an original position by its own elastic force. Accordingly, switch 110AB which has been in a closed state is again in an open state. In other words, four switches 110AB included in function switch unit 112 return to their initial states by removal of label body 122 from control device 100 (housing 900). When any of label bodies 120 is later mounted to this mounting position, the movable part of movable contactor 112a displaces according to the shape (the number of ribs 120c provided to protruding part 120b and the locations where they are provided) of protruding part 120b (which is a protruding part of any of label bodies 120) of label body 120.

Recess 122d provided on the side surface on the opposite side of protruding part 122b from the side surface where rib 122c is provided is an engagement section engaged with protruding part 950 of housing 900 in a direction (an x axis direction) perpendicular to the insertion direction of protruding part 122b as illustrated in FIG. 4B. With this configuration, when rib 122c presses movable contactor 112a in the positive direction of the x axis, a force in the positive direction of the x axis is applied to protruding part 122b to prevent protruding part 122b from being pushed back in the negative direction of the x axis by the elastic force of movable contactor 112a. In addition, the engagement between recess 122d and protruding part 950 prevents label body 122 from moving and dropping off in a direction opposite to the insertion direction when the attitude of control device 100 is changed. That is, the engagement section (for example, recess 122d) is engaged with housing 900 (protruding part 950) in the direction perpendicular to the insertion direction of label bodies 120 to stabilize label bodies 120 at the respective mounting positions, when label bodies 120 are mounted to control device 100 (housing 900).

As described above, protruding part 120b (for example, protruding part 122b) of label body 120 (for example, label body 122) presses and displaces movable contactor 110a (for example, movable contactor 112a) of each switch 110AB disposed at a position corresponding to the mounting position of label body 120 in a predetermined direction by rib 120c (for example, rib 122c) provided to protruding part 120b, when label body 120 is mounted to control device 100 (housing 900). The combination of open or closed states of respective switches 110AB included in function switch unit 110 (for example, function switch unit 112) disposed at a position corresponding to the mounting position of label body 120 is determined according to the number and arrangement positions of ribs 120c provided to protruding part 120b. Regarding other label bodies 120 (for example, label bodies 121, 123, and 124), the combination of open or closed states of respective switches 110AB included in function switch unit 110 disposed at a position corresponding to the mounting position of each label body 120 is determined according to the number and arrangement positions of ribs 120c provided on the side surface of protruding part 120b of each label body 120, as in label body 122.

Next, one example of a configuration in which a function of each key 500 is determined by using label body 120 described above will be described.

FIG. 5 is a block diagram illustrating an example of the configuration of control device 100 according to the first exemplary embodiment.

Control device 100 includes key 500 (keys 501 to 504 are only illustrated in FIG. 5), label body 120 (label bodies 121 and 122 are only illustrated in FIG. 5), function switch unit 110 (function switch units 111 and 112 are only illustrated in FIG. 5), microcomputer 600, memory 700, and output unit 300.

Portions enclosed by a broken line in FIG. 5 indicate correspondence between key 500 and function switch unit 110. This correspondence is defined as follows in the present exemplary embodiment. In a case where certain function switch unit 110 is involved in determining an operation (a function assigned to key 500) to be executed by an electronic device by control device 100 outputting a signal according to an operation (for example, depression) performed by a user on certain key 500, function switch unit 110 and key 500 are defined to correspond to each other.

Note that FIG. 5 does not illustrate protruding part 121b and protruding part 122b. In addition, components which are necessary for the operation of control device 100 but are not required for the description of the control device in the present disclosure, such as a power source, are not illustrated.

In the example in FIG. 5, label body 121 is mounted at a predetermined position (a position corresponding to key 501) of housing 900. A combination of open or closed states of respective switches 110AB included in function switch unit 110 (function switch unit 111) corresponding to key 501 is set by protruding part 121b of label body 121.

In the example illustrated in FIG. 5, a combination of open or closed states of respective switches 110AB included in function switch unit 111 is set by label body 121 such that uppermost switch 110AB in FIG. 5 is in a closed state and other switches 110AB are in an open state.

Label body 122 is mounted at a predetermined position (a position corresponding to key 502) of housing 900 different from the mounting position of label body 121. A combination of open or closed states of respective switches 110AB included in function switch unit 110 (function switch unit 112) corresponding to key 502 is set by protruding part 122b of label body 122.

In the example illustrated in FIG. 5, a combination of open or closed states of respective switches 110AB included in function switch unit 112 is set by label body 122 such that second and fourth switches 110AB from top in FIG. 5 are in a closed state and other switches 110AB are in an open state.

One end of each of a plurality of switches 110AB included in function switch unit 110 is grounded, and the other end is connected to microcomputer 600. A potential at microcomputer 600 is changed by a changeover of each switch 110AB between an open state and a closed state.

Microcomputer 600 is connected to key 500 and respective switches 110AB. When any one of keys 500 is operated (pressed) by a user, microcomputer 600 detects this operation. Then, microcomputer 600 acquires, based on the potential, the open or closed state of each switch 110AB included in function switch unit 110 corresponding to key 500 which has been operated. In this way, microcomputer 600 detects a combination of open or closed states of respective switches 110AB.

Memory 700 is connected to microcomputer 600. Memory 700 stores, in association with each other, combinations of open or closed states of respective switches 110AB and various codes for prompting the electronic device to be controlled to execute various kinds of operations. Microcomputer 600 then acquires a code associated with the combination of open or closed states of respective switches 110AB, which have been detected, from memory 700.

As illustrated in Table 1, for example, memory 700 stores, in association with each other, combinations of open or closed states of a plurality of switches 110AB (for example, four switches 110AB) included in one function switch unit 110 and codes for prompting the electronic device to be controlled to execute a predetermined operation. In Table 1, "0" in a left column (a column indicating open or closed states) indicates that switch 110AB is in an open state and "1" indicates that switch 110AB is in a closed state. One four-digit figure including four numbers, each of which is "0" or "1" described above, indicates one of combinations of open or closed states of four switches 110AB. In Table 1, a four-digit figure indicating a combination of open or closed states and a code associated therewith are indicated in the same row. In the column indicating open or closed states, "0" may indicate the closed state and "1" may indicate the open state.

TABLE 1

| OPEN OR CLOSED STATE | CODE |
|---|---|
| 0000 | 0x40, 0x04, 0x01, 0x00, 0xBC, 0xBD |
| 0001 | 0x40, 0x04, 0x01, 0x00, 0xA0, 0xA1 |
| ... | ... |
| 0101 | 0x40, 0x04, 0x01, 0x00, 0xA8, 0xA9 |
| ... | ... |
| 1000 | 0x40, 0x04, 0x01, 0x00, 0xE8, 0xE9 |
| ... | ... |
| 1111 | 0x40, 0x04, 0x01, 0x00, 0x98, 0x99 |

The maximum number of ribs 120c on label body 120 illustrated in the present exemplary embodiment is four, and therefore, there are sixteen (2*2*2*2=16) combinations, which can be set by label body 120, of open or closed states of four switches 110AB. Although not illustrated in Table 1, memory 700 also stores different codes, each of which is associated with each of sixteen combinations (0000 to 1111) of open or closed states of switches 110AB. Memory 700 is one example of the storage in the present disclosure, and can be achieved by using a semiconductor memory, for example.

Output unit 300 is provided with an infrared-emitting diode in the example illustrated in FIG. 5. Microcomputer 600 is also connected to output unit 300. Microcomputer 600 causes output unit 300 to output a signal (for example, infrared signal) indicating the code acquired from memory 700. Microcomputer 600 is one example of the control unit in the present disclosure.

The present exemplary embodiment has described the configuration in which switch 110AB is brought into a closed state by being pressed by protruding part 120b on label body 120 mounted to control device 100 (housing 900). However, the configuration of switch 110AB is not limited thereto. Switch 110AB may be switched between an open state and a closed state by being pressed by protruding part 120b. Specifically, a switch configured to be in a closed state in an initial state and to be brought into an open state by being pressed by protruding part 120b on label body 120 mounted to control device 100 (housing 900) may be used as switch 110AB.

[1-2. Operation]

An operation of control device 100 configured as described above will be described below. Now, such an example will be described where control apparatus 10 belongs to a TV receiver, and a user operates control apparatus 10 including control device 100 to control the TV receiver.

In this example, it is supposed that label body 122 is mounted at the mounting position (the position corresponding to key 502) illustrated in the drawings referred to in the above description. A combination of open or closed states of four switches 110AB included in function switch unit 112 corresponding to key 502 is set by label body 122 mounted at the mounting position. This combination is "open state (0)-closed state (1)-open state (0)-closed state (1)" in order in the negative direction of the z axis in the drawings (see FIG. 3A). It is also supposed that a display of "audio switching" is attached on the surface of display part 122a of label body 122. It is also supposed that codes "0x40, 0x04, 0x01, 0x00, 0xA8, 0xA9" (see Table 1) corresponding to the open or closed state "0101" are codes for prompting the TV receiver to execute audio output switching (an operation for selectively switching between a main audio program and a second audio program).

It is assumed that the user presses key 502, on control apparatus 10 set as described above, corresponding to label body 122 having a display of "audio switching" for changing the audio program of the bilingual broadcast that the user is currently watching on the TV receiver.

When key 502 is pressed by the user, microcomputer 600 detects that key 502 is pressed. In response to the detection, microcomputer 600 then detects a combination of open or closed states of four switches 110AB included in function switch unit 112 corresponding to key 502. In this case, the combination of open or closed states is "open state (0)-closed state (1)-open state (0)-closed state (1)".

Microcomputer 600 then accesses to memory 700 to acquire a code associated with this combination of open or closed states. Microcomputer 600 replaces the above combination with "0101", and acquires the code "0x40, 0x04, 0x01, 0x00, 0xA8, 0xA9" associated with this figure from memory 700 (see Table 1).

Then, microcomputer 600 controls output unit 300 such that a signal indicating the acquired code is transmitted from output unit 300. According to this control, output unit 300 outputs the signal indicating this code.

The TV receiver receiving the signal output from output unit 300 switches the audio output to the second audio program from the main audio program or to the main audio program from the second audio program based on this signal.

In this way, in control apparatus 10 including control device 100, a signal corresponding to the function (for example, audio switching) assigned to label body 120 (for example, label body 122) is transmitted to the electronic device to be controlled (for example, TV receiver) from control apparatus 10 according to the operation (depression) performed by the user on key 500 (for example, key 502). The electronic device (for example, TV receiver) receiving this signal then executes an operation (for example, audio switching) desired by the user.

Next, an example of customizing an assignment of functions to key 500 will be described.

It is supposed that a display of "Internet" is attached on the surface of display part 121a of label body 121.

A situation is assumed where label body 122 on control device 100 is exchanged for label body 121 having the display of "Internet" by the user for customizing the assignment of functions to key 500.

Before label body 121 is exchanged for label body 122, key 501 corresponds to label body 121, and a combination of open or closed states of four switches 110AB included in function switch unit 111 corresponding to key 501 is "closed state (1)-open state (0)-open state (0)-open state (0)" in order in the negative direction of the z axis in the drawing (see FIG. 3A). When label body 121 is exchanged for label body 122, the combination of open or closed states of four switches 110AB included in function switch unit 112 corresponding to key 502 becomes "closed state (1)-open state (0)-open state (0)-open state (0)" in order in the negative direction of the z axis in the drawing. Specifically, the open or closed states of four switches 110AB included in function switch unit 112 corresponding to key 502 is changed to "1000" from the above "0101". It is supposed herein that the code "0x40, 0x04, 0x01, 0x00, 0xE8, 0xE9" (see Table 1) corresponding to the open or closed states "1000" is a code for prompting the TV receiver to generate a sub-screen, to display a television broadcast in the sub-screen, to start a web browser, and to display the web browser in a main screen.

It is assumed that the user presses key 502, on control apparatus 10 set as described above, corresponding to label body 121 having a display of "Internet" for doing a search on the Internet for information regarding the program that the user is now watching on the TV receiver.

When key 502 is pressed by the user, microcomputer 600 detects that key 502 is pressed. In response to the detection, microcomputer 600 then detects a combination of open or closed states of four switches 110AB included in function switch unit 112 corresponding to key 502. In this case, the combination of open or closed states is "closed state (1)-open state (0)-open state (0)-open state (0)".

Microcomputer 600 then accesses to memory 700 to acquire a code associated with this combination of open or closed states. Microcomputer 600 replaces the above combination with "1000", and acquires the code "0x40, 0x04, 0x01, 0x00, 0xE8, 0xE9" associated with this figure from memory 700 (see Table 1).

Then, microcomputer 600 controls output unit 300 such that a signal indicating the acquired code is transmitted from output unit 300. According to this control, output unit 300 outputs the signal indicating this code.

The TV receiver receiving the signal output from output unit 300 generates the sub-screen, displays the television broadcast in the sub-screen, starts the web browser, and displays the web browser in the main screen, based on this signal.

As described above, in control apparatus 10 including control device 100, the user can change the assignment of functions to key 500 (for example, change the assignment of function to key 502 to "display of internet connection screen" from "audio switching") only by exchanging label bodies 120 (for example, by exchanging label body 121 for label body 122).

[1-3. Effects]

As described above, in the present exemplary embodiment, the control device is a control device for controlling an electronic device and includes: an output unit that outputs a signal for prompting the electronic device to execute a predetermined operation; a function switch unit that includes a plurality of switches each having a contactor formed such that at least a portion of the contactor is elastically displaceable in a predetermined direction, the switches each being switched between an open state and a closed state due to displacement of the at least a portion of the contactor in the predetermined direction; and a label body that has a display part and a protruding part protruding from the display part, the label body being mounted in a state where the protruding part is inserted into a hole in a housing and the display part is positioned on an outside of the housing. The protruding part of the label body determines a combination of open or closed states of the plurality of switches switched when the protruding part presses and displaces at least one of the contactors of the plurality of switches in the predetermined direction. The predetermined operation is determined according to the combination.

Control device 100 is one example of the control device. The TV receiver is one example of the electronic device. Key 500 is one example of the operation unit. Output unit 300 is one example of the output unit. Movable contactor 110a is one example of the contactor. Switch 110AB is one example of the switch which is switched between an open state and a closed state. Function switch unit 110 is one example of the function switch unit. Display part 120a is one example of the display part. Protruding part 120b is one example of the protruding part. Housing 900 is one example of the housing. Hole 910 is one example of the hole. Label body 120 is one example of the label body.

For example, in the example illustrated in the first exemplary embodiment, control device 100 for controlling an electronic device (for example, a TV receiver) includes key 500, output unit 300, function switch unit 110, and label body 120.

Key 500 is operated (for example, pressed) by a user.

Output unit 300 outputs a signal for prompting the electronic device (for example, TV receiver) to execute a predetermined operation in response to the operation (for example, depression) performed on the operation unit by the user.

Function switch unit 110 includes a plurality of switches 110AB each having movable contactor 110a formed such that at least a portion of movable contactor 110a is elastically displaceable in a predetermined direction, switch 110AB being switched between an open state and a closed state due to displacement of the at least a portion of movable contactor 110a in the predetermined direction.

Label body 120 has display part 120a and protruding part 120b protruding from display part 120a, label body 120 being mounted to control device 100 (housing 900) in a state where protruding part 120b is inserted into hole 910 in housing 900 of control device 100 and display part 120a is positioned on the outside of housing 900.

When label body 120 is mounted to control device 100 (housing 900), protruding part 120b of label body 120 determines a combination of open or closed states of the plurality of switches 110AB switched when protruding part 120b presses and displaces movable parts, which are at least a portion of at least one of movable contactors 110a of the plurality of switches 110AB, in the predetermined direction (for example, the positive direction of the x axis). The predetermined operation (for example, "audio switching" or "display of internet connection screen") of the electronic device is determined according to the combination.

The control device (for example, control device 100) thus configured enables the user to change the assignment of functions to the operation unit (for example, key 500) only by exchanging a plurality of label bodies (for example, label bodies 120) for one another.

In the control device, the predetermined direction may be substantially perpendicular to a direction in which the protruding part is inserted, and the protruding part may press and displace at least a portion of the contactor by a part of the protruding part other than a tip of the protruding part, when the label body is mounted to the control device.

For example, the predetermined direction is substantially perpendicular to the insertion direction of protruding part 120b in the example described in the first exemplary embodiment. In addition, when label body 120 is mounted to control device 100 (housing 900), protruding part 120b presses the movable part of movable contactor 110a to displace the movable part by a portion (for example, side surface) of protruding part 120b other than the tip of protruding part 120b.

In the present exemplary embodiment, the control device may further include an operation unit, a control unit electrically connected to the operation unit, the plurality of switches, and the output unit, and a storage connected to the control unit. The storage may store, in association with each other, a combination of open or closed states and a code for prompting the electronic device to execute the predetermined operation. When detecting an operation of the operation unit, the control unit may detect a combination of open or closed states of the plurality of switches, acquire a code associated with the detected combination of open or closed states from the storage, and cause the output unit to output the acquired code as a signal.

Key 500 is one example of the operation unit. Microcomputer 600 is one example of the control unit. Memory 700 is one example of the storage.

For example, in the example in the first exemplary embodiment, control device 100 further includes key 500, microcomputer 600 electrically connected to key 500, a plurality of function switch units 110, and output unit 300, and memory 700 connected to microcomputer 600.

Memory 700 stores, in association with each other, a combination of open or closed states of a plurality of switches 110AB and a code for prompting the electronic device (for example, TV receiver) to execute the predetermined operation.

When detecting an operation (depression) performed on key 500 by the user, microcomputer 600 detects a combination of open or closed states of the plurality of switches 110AB included in function switch unit 110 corresponding to key 500, and acquires a code associated with the detected combination of open or closed states from memory 700. Microcomputer 600 then causes output unit 300 to output the acquired code as a signal.

The control device (for example, control device 100) thus configured enables the user to change the assignment of functions to the operation unit (for example, key 500) only by exchanging a plurality of label bodies (for example, label bodies 120) for one another.

In the present exemplary embodiment, a display indicating the predetermined operation is attached to display part 120a.

Thus, the user can change the assignment of functions to key 500 by mounting label body 120, which is selected according to the display on display part 120a, to control device 100 (housing 900). Specifically, the user using control device 100 does not need to change the display on key 500 by himself/herself according to the customization of functions of control device 100 or to change settings of control device 100 or the electronic device according to the display on key 500, whereby convenience of the user can be improved.

First Modification of First Exemplary Embodiment

A first modification of the first exemplary embodiment will be described below with reference to FIGS. 6 to 8.

[2-1. Configuration]

A configuration of control device 1100 in the present modification is substantially the same as the configuration of control device 100 described in the first exemplary embodiment. Specifically, the configuration of control device 1100 in the present modification for enabling a user to easily change an assignment of functions to the operation unit by exchanging label bodies is substantially the same as control device 100 in the first exemplary embodiment. The present modification will be described below, focusing on differences from the first exemplary embodiment.

Control device 1100 in the present modification further has an insertion detecting switch that detects whether or not label body 120 is mounted to the control device, in addition to the components of control device 100 described in the first exemplary embodiment. Control device 1100 in the present modification is different in this point from control device 100 described in the first exemplary embodiment.

Figure 6:
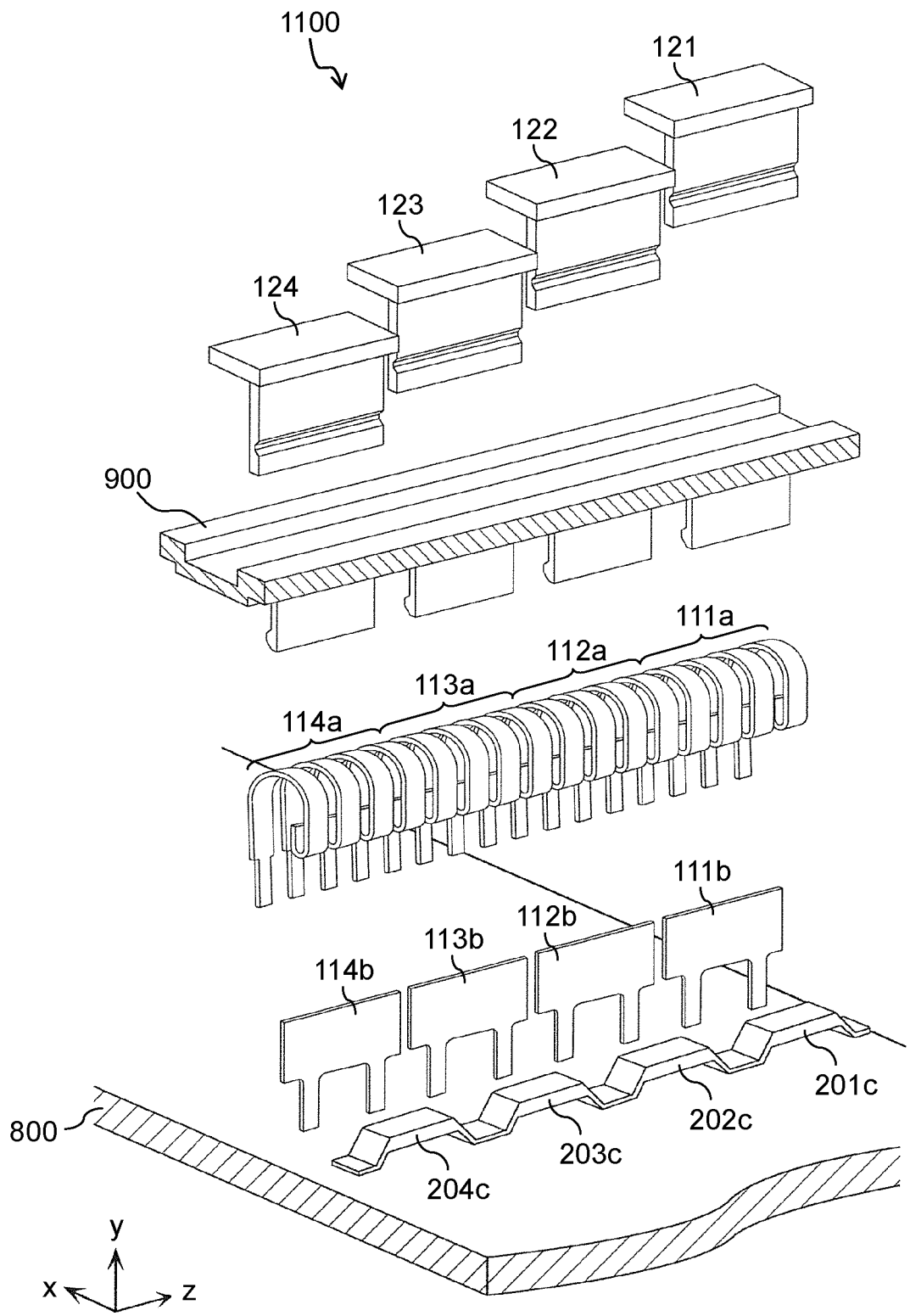
FIG. 6 is an exploded perspective view schematically illustrating one example of a part of a control device included in a control apparatus according to a first modification of the first exemplary embodiment.

FIG. 6 is an exploded perspective view schematically illustrating one example of a part of control device 1100 included in control apparatus 10 according to the first modification of the first exemplary embodiment. FIG. 6 is an exploded perspective view of a part of control device 1100 as viewed from almost the same direction as in the exploded perspective view in FIG. 3B.

It should be noted that constituent elements in the present modification which are substantially identical to constituent elements of control device 100 described in the first exemplary embodiment are denoted by identical reference numerals and will not be described below.

FIG. 6 illustrates insertion detecting switch covers 201c to 204c provided to control device 1100, in addition to the components of control device 100 in the first exemplary embodiment illustrated in FIG. 3B. Hereinbelow, insertion detecting switch covers 201c to 204c may be collectively or interchangeably referred to as insertion detecting switch cover 200c. Insertion detecting switch cover 200c is formed by molding an elastic body (for example, silicon rubber) having insulating properties.

Insertion detecting switches 201 to 204 are provided below respective insertion detecting switch covers 200c on substrate 800. Hereinbelow, insertion detecting switches 201 to 204 may be collectively or interchangeably referred to as insertion detecting switch 200. Insertion detecting switch 200 is a switch which is switched between an open state and a closed state due to displacement of at least a portion when being pressed by label body 120 mounted to control device 1100 (housing 900).

Various kinds of mechanisms which can implement the function described above are usable as insertion detecting switch 200. For example, insertion detecting switch 200 may be configured to include a fixed contactor formed by attaching a metal plate on substrate 800 just below insertion detecting switch cover 200c and a movable contactor formed from a metal plate spring having a shape substantially conforming to the surface of insertion detecting switch cover 200c facing substrate 800 illustrated in FIG. 6.

When a pressing force is applied from label body 120 mounted to control device 1100 (housing 900) in the direction in which label body 120 is inserted, movable contactor 200a is brought into contact with fixed contactor 200b due to displacement of at least a portion thereof toward substrate 800. The displacing portion may be referred to as a movable part below. Due to the contact, insertion detecting switch 200 is brought into a closed state. When the pressing force is absent, movable contactor 200a returns to an original position by its own elastic force. Accordingly, insertion detecting switch 200 which has been in the closed state is again in an open state. Respective movable contactors 200a of insertion detecting switches 201 to 204 may be also referred to as movable contactors 201a to 204a below. Respective fixed contactors 200b of insertion detecting switches 201 to 204 may be also referred to as fixed contactors 201b to 204b below.

A direct contact between label body 120 made of ABS resin and movable contactor 200a formed from a metal plate may cause damage or wear on insertion detecting switch 200 during insertion and removal of label body 120. Insertion detecting switch cover 200c can prevent the damage or wear, or suppress an impact on insertion detecting switch 200 caused by static electricity from the outside of housing 900 (for example, static electricity charged in the user).

Figure 7A:
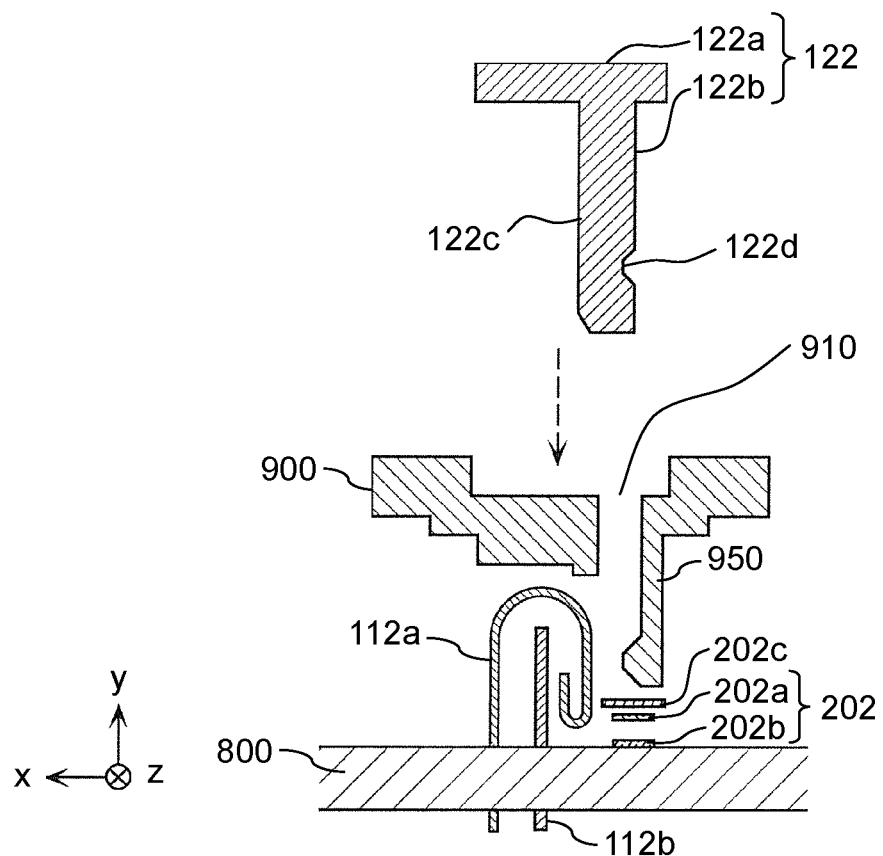
FIG. 7A is a sectional view schematically illustrating one example of a part of the control device included in the control apparatus according to the first modification of the first exemplary embodiment.
Figure 7B:
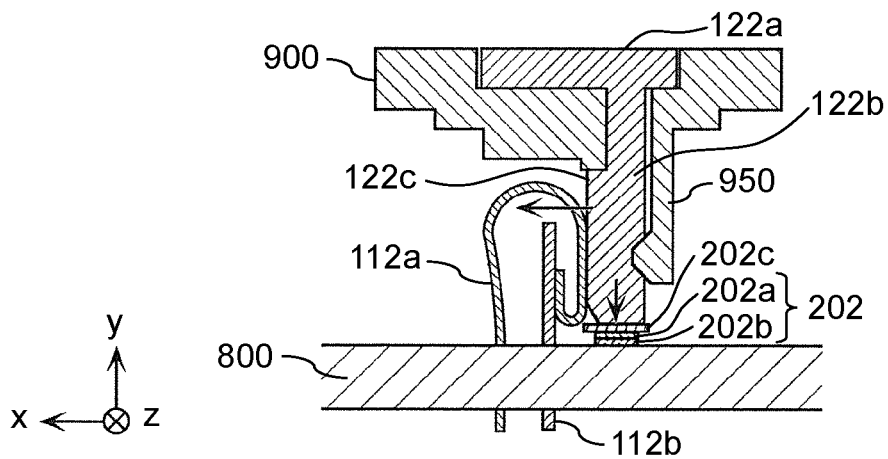
FIG. 7B is a sectional view schematically illustrating one example of a part of the control device included in the control apparatus according to the first modification of the first exemplary embodiment.

FIGS. 7A and 7B are sectional views schematically illustrating one example of a part of control device 1100 included in control apparatus 10 according to the first modification of the first exemplary embodiment.

The direction of the cut surface in FIGS. 7A and 7B is substantially the same as in FIGS. 4A and 4B. As in FIG. 4A, FIG. 7A illustrates a state before label body 120 (label body 122 in the example in FIG. 7A) is mounted to control device 1100 (housing 900), and as in FIG. 4B, FIG. 7B illustrates a state where label body 120 (label body 122 in the example in FIG. 7B) is mounted to control device 1100 (housing 900).

FIGS. 7A and 7B illustrate insertion detecting switch 202 as one example of insertion detecting switch 200. Therefore, the movable contactor disposed below insertion detecting switch cover 202c is movable contactor 202a, and the fixed contactor disposed below movable contactor 202a on substrate 800 is fixed contactor 202b.

When label body 122 is not mounted to housing 900, movable contactor 202a and fixed contactor 202b are not in contact with each other as illustrated in FIG. 7A. In other words, insertion detecting switch 202 is in an open state in an initial state (where label body 122 is not mounted to housing 900). Label body 122 is mounted to control device 1100 (housing 900) as illustrated in FIG. 7B by inserting protruding part 122b into hole 910 in housing 900 in the negative direction of the y axis as indicated by a broken line arrow in FIG. 7A.

When label body 122 is mounted to control device 1100 (housing 900), protruding part 122b presses movable contactor 112a to displace the movable part of movable contactor 112a by rib 122c provided on the side surface as described in the first exemplary embodiment. In addition, in the present modification, protruding part 122b presses insertion detecting switch cover 202c in the insertion direction by a tip to displace insertion detecting switch cover 202c in the insertion direction. The tip of protruding part 122b also presses movable contactor 202a of insertion detecting switch 202 in the insertion direction of protruding part 122b through insertion detecting switch cover 202c, thereby displacing the movable part of movable contactor 202a. Due to the displacement, movable contactor 202a and fixed contactor 202b are brought into contact with each other. In other words, insertion detecting switch 202 is turned into a closed state.

An amount of displacement of the movable part of movable contactor 202a by pressure from protruding part 122b is set to fall within the elasticity range of movable contactor 202a. Therefore, when label body 122 is removed from control device 1100 (housing 900), the movable part of movable contactor 202a pressed by protruding part 122b returns to an original position by its own elastic force. Accordingly, insertion detecting switch 202 which has been in the closed state is again in an open state. In other words, insertion detecting switch 202 returns to its initial state by removal of label body 122 from control device 1100 (housing 900). When any one of label bodies 120 is later mounted to this mounting position, the movable part of movable contactor 202a again displaces due to pressure from the protruding part of label body 120.

As described above, the switch (insertion detecting switch 200) which is switched between an open state and a closed state by label body 120 mounted to control device 1100 (housing 900) is mounted to control device 1100, whereby control device 1100 enables detection of the mounting of label body 120 to the respective mounting positions by microcomputer 600 according to the following configuration, for example.

Figure 8:
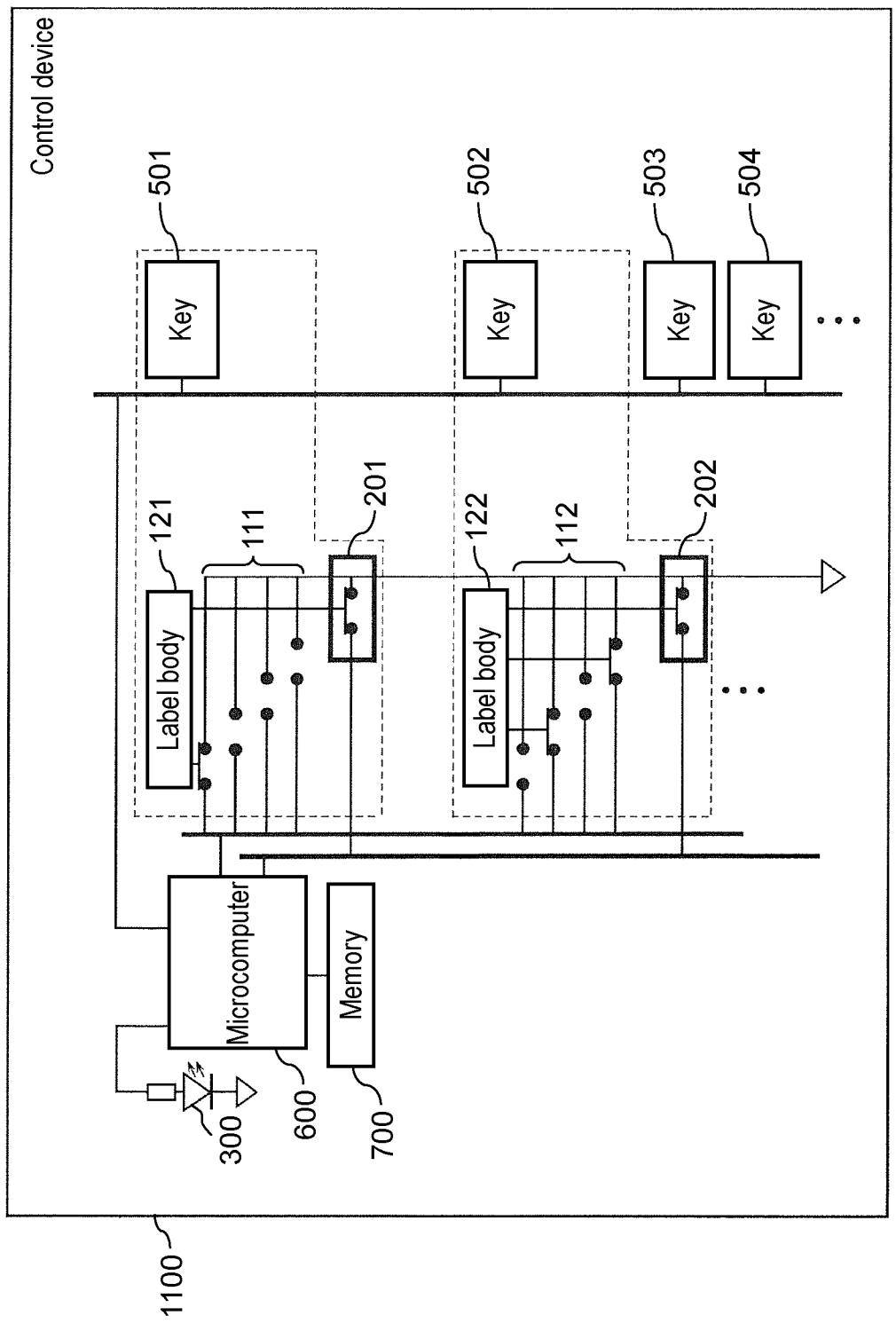
FIG. 8 is a block diagram illustrating one example of a configuration of the control device according to the first modification of the first exemplary embodiment.

FIG. 8 is a block diagram illustrating one example of the configuration of control device 1100 according to the first modification of the first exemplary embodiment.

Control device 1100 includes key 500 (keys 501 to 504 are only illustrated in FIG. 8), label body 120 (label bodies 121 and 122 are only illustrated in FIG. 8), function switch unit 110 (function switch units 111 and 112 are only illustrated in FIG. 8), insertion detecting switches 201 and 202, microcomputer 600, memory 700, and output unit 300.

Portions enclosed by a broken line in FIG. 8 indicate correspondence among key 500, function switch unit 110, and insertion detecting switch 200. Insertion detecting switch 201 is substantially the same as insertion detecting switch 202 and corresponds to key 501. In the present modification, the definition for the correspondence between function switch unit 110 and key 500 is the same as the definition in the first exemplary embodiment. The correspondence between insertion detecting switch 200 and key 500 is defined as follows. In a case where the function of certain key 500 is determined by certain label body 120 mounted appropriately to a certain mounting position, insertion detecting switch 200 detecting the mounting of label body 120 to the mounting position is defined to correspond to key 500.

Note that FIG. 8 does not illustrate protruding part 121b and protruding part 122b. In addition, components which are necessary for the operation of control device 1100 but are not required for the description of the control device in the present disclosure, such as a power source, are not illustrated.

The relation between label body 121 and the function assigned to each key 500 is the same as that in the first exemplary embodiment, and therefore, it will not be described below.

One end of insertion detecting switch 200 is grounded, and the other end is connected to microcomputer 600. A potential at microcomputer 600 is changed by a changeover of each insertion detecting switch 200 between an open state and a closed state. Thus, microcomputer 600 detects an open or closed state of insertion detecting switch 200.

The present modification has described the configuration in which insertion detecting switch 200 is brought into a closed state by being pressed by protruding part 120b on label body 120 mounted to control device 1100 (housing 900). However, in the present disclosure, the configuration of insertion detecting switch 200 is not limited thereto. Insertion detecting switch 200 may be switched between an open state and a closed state by being pressed by protruding part 120b on label body 120 which is appropriately mounted. Specifically, a switch configured to be in a closed state in an initial state and to be brought into an open state by being pressed by protruding part 120b on label body 120 mounted to control device 1100 (housing 900) may be used as insertion detecting switch 200.

[2-2. Operation]

An operation of control device 1100 configured as described above will be described below.

When any one of keys 500 is operated (pressed) by the user, microcomputer 600 detects that key 500 is operated, and detects an open or closed state of insertion detecting switch 200 corresponding to operated key 500 based on a potential as described above.

When the open or closed state of insertion detecting switch 200 indicates a state where label body 120 is inserted (when insertion detecting switch 200 is in a closed state in the present modification), microcomputer 600 causes output unit 300 to output a signal indicating a predetermined code (a code corresponding to key 500 operated by the user) according to the operation described in the first exemplary embodiment in response to the operation performed on key 500 by the user.

When the open or closed state of insertion detecting switch 200 indicates a state where label body 120 is not inserted (when insertion detecting switch 200 is in an open state in the present modification), microcomputer 600 does not perform an operation for causing output unit 300 to output the signal indicating the predetermined code (the code corresponding to key 500 operated by the user) in response to the operation performed on key 500 by the user.

[2-3. Effects]

As described above, in the first modification of the first exemplary embodiment, the control device may further include an operation unit and an insertion detecting switch that is a switch switched between an open state and a closed state due to displacement of at least a portion of the insertion detecting switch when being pressed by the protruding part. The output unit may output a signal for prompting the electronic device to execute a predetermined operation in response to an operation of the operation unit when the insertion detecting switch is in one state of the open state and the closed state, and the output unit may not output the signal in response to the operation of the operation unit when the insertion detecting switch is in the other state of the open state and the closed state.

Key 500 is one example of the operation unit. Control device 1100 is one example of the control device. Insertion detecting switch 200 is one example of the insertion detecting switch.

In the example in the first modification of the first exemplary embodiment, control device 1100 further includes insertion detecting switch 200 which is switched between an open state and a closed state due to displacement of at least a portion of insertion detecting switch 200 when being pressed by protruding part 120b of label body 120 mounted to control device 1100 (housing 900), in addition to the configuration of control device 100 described in the first exemplary embodiment, for example.

In control device 1100, output unit 300 outputs the signal for prompting the electronic device to be controlled to execute a predetermined operation in response to the operation performed on key 500 by the user, when insertion detecting switch 200 is in the closed state, for example. On the other hand, output unit 300 does not output the signal in response to the operation performed on key 500 by the user, when insertion detecting switch 200 is in the open state, for example.

To describe the effect of the insertion detecting switch, a configuration in which the control device does not have insertion detecting switch 200 is assumed. In this configuration, some kind of code is supposed to be associated with a combination (for example, "0000") of open or closed states where all switches 110AB included in single function switch unit 110 are in an initial state. In such a configuration, even when label body 120 is not mounted to a mounting position of housing 900, microcomputer 600 causes output unit 300 to output a signal indicating the code in response to an operation (depression) performed by the user on key 500 corresponding to the mounting position.

However, according to the configuration in the present modification, microcomputer 600 causes output unit 300 to output a signal indicating the code corresponding to key 500 in response to an operation (depression) performed by the user on key 500, only when label body 120 is appropriately mounted to the mounting position. Thus, the present modification can prevent the electronic device from executing an operation unintended by the user.

Alternatively, in the configuration in which the control device does not have insertion detecting switch 200, it is assumed that no code is associated with the combination of open or closed states (for example, "0000") where switches 110AB are all in an initial state in order to prevent the electronic device from being controlled by mistake. However, in control device 1100 provided with insertion detecting switch 200, some kind of code can be associated with even the combination of open or closed states (for example, "0000") where switches 110AB are all in an initial state. Therefore, in the configuration in the present modification, options of functions that can be assigned to key 500 by the user can be increased.

Second Modification of First Exemplary Embodiment

A second modification of the first exemplary embodiment will be described below with reference to FIGS. 9 to 11C.

[3-1. Configuration and Operation]

A configuration of control device 2100 in the present modification is substantially the same as the configuration of control device 100 described in the first exemplary embodiment. Specifically, the configuration of control device 2100 in the present modification for enabling a user to easily change the assignment of functions to the operation unit by exchanging label bodies is substantially the same as control device 100 in the first exemplary embodiment. The present modification will be described below, focusing on differences from the first exemplary embodiment.

Control device 2100 according to the present modification further includes an insulating member for suppressing an impact on function switch unit 110 due to static electricity (for example, static electricity charged in the user) from the outside of housing 900, in addition to the components of control device 100 described in the first exemplary embodiment. Control device 2100 in the present modification is different in this point from control device 100 described in the first exemplary embodiment.

Figure 9:
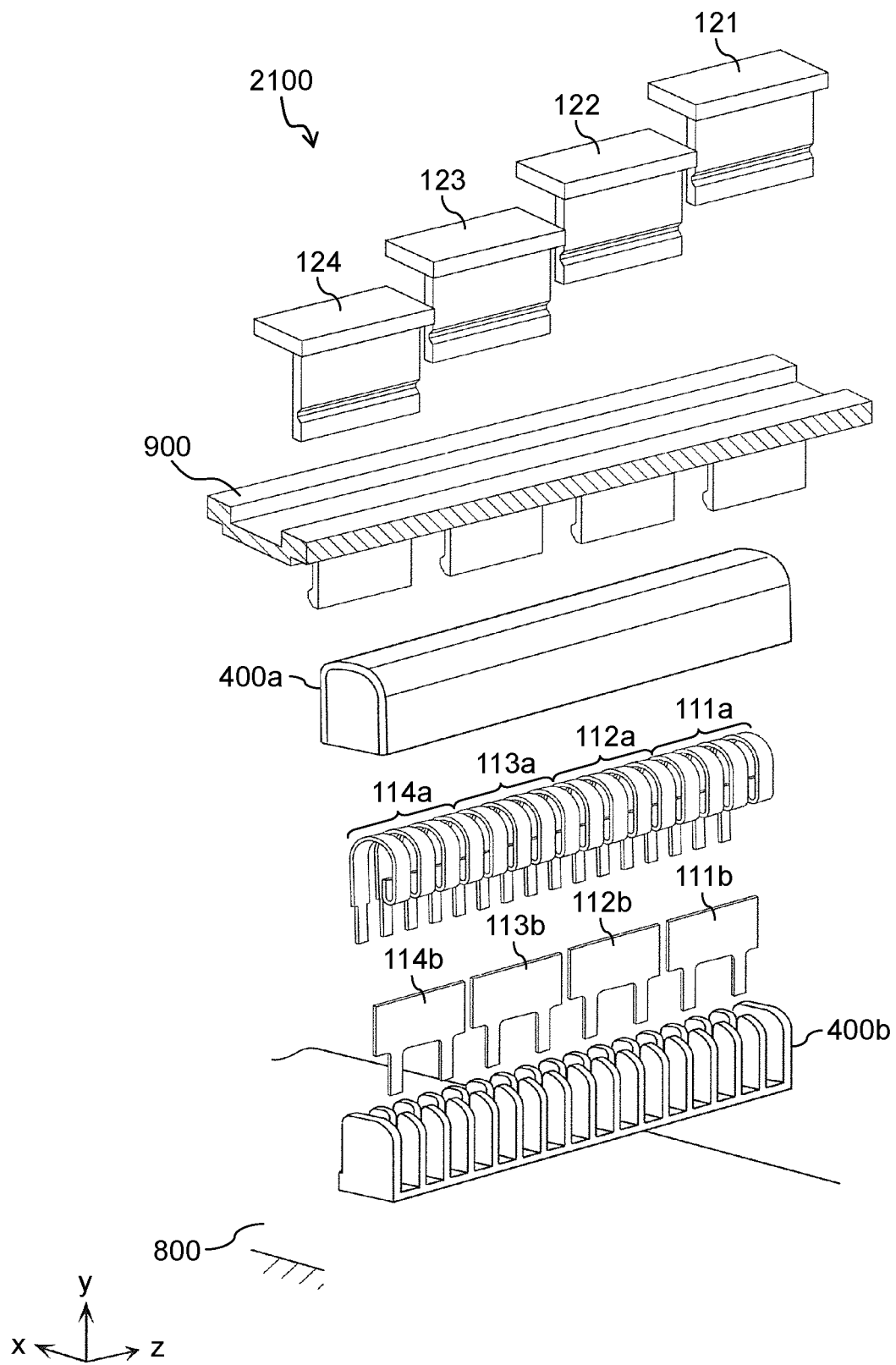
FIG. 9 is an exploded perspective view schematically illustrating one example of a part of a control device included in a control apparatus according to a second modification of the first exemplary embodiment.

FIG. 9 is an exploded perspective view schematically illustrating one example of a part of control device 2100 included in control apparatus 10 according to the second modification of the first exemplary embodiment. FIG. 9 is an exploded perspective view of a part of control device 2100 as viewed from almost the same direction as in the exploded perspective view in FIG. 3B.

It should be noted that constituent elements in the present modification which are substantially identical to constituent elements of control device 100 described in the first exemplary embodiment are denoted by identical reference numerals and will not be described below.

FIG. 9 illustrates rubber cap 400a and housing 400b provided to control device 2100, in addition to the components of control device 100 in the first exemplary embodiment illustrated in FIG. 3B.

Rubber cap 400a is formed by molding an elastic body (for example, silicon rubber) having insulating properties. Rubber cap 400a is one example of the first insulating member in the present modification.

Housing 400b is formed by molding a resin (for example, polypropylene) having insulating properties. Housing 400b is one example of the second insulating member in the present modification.

In the description below, rubber cap 400a and housing 400b may also be collectively referred to as insulating member 400.

Figure 10:
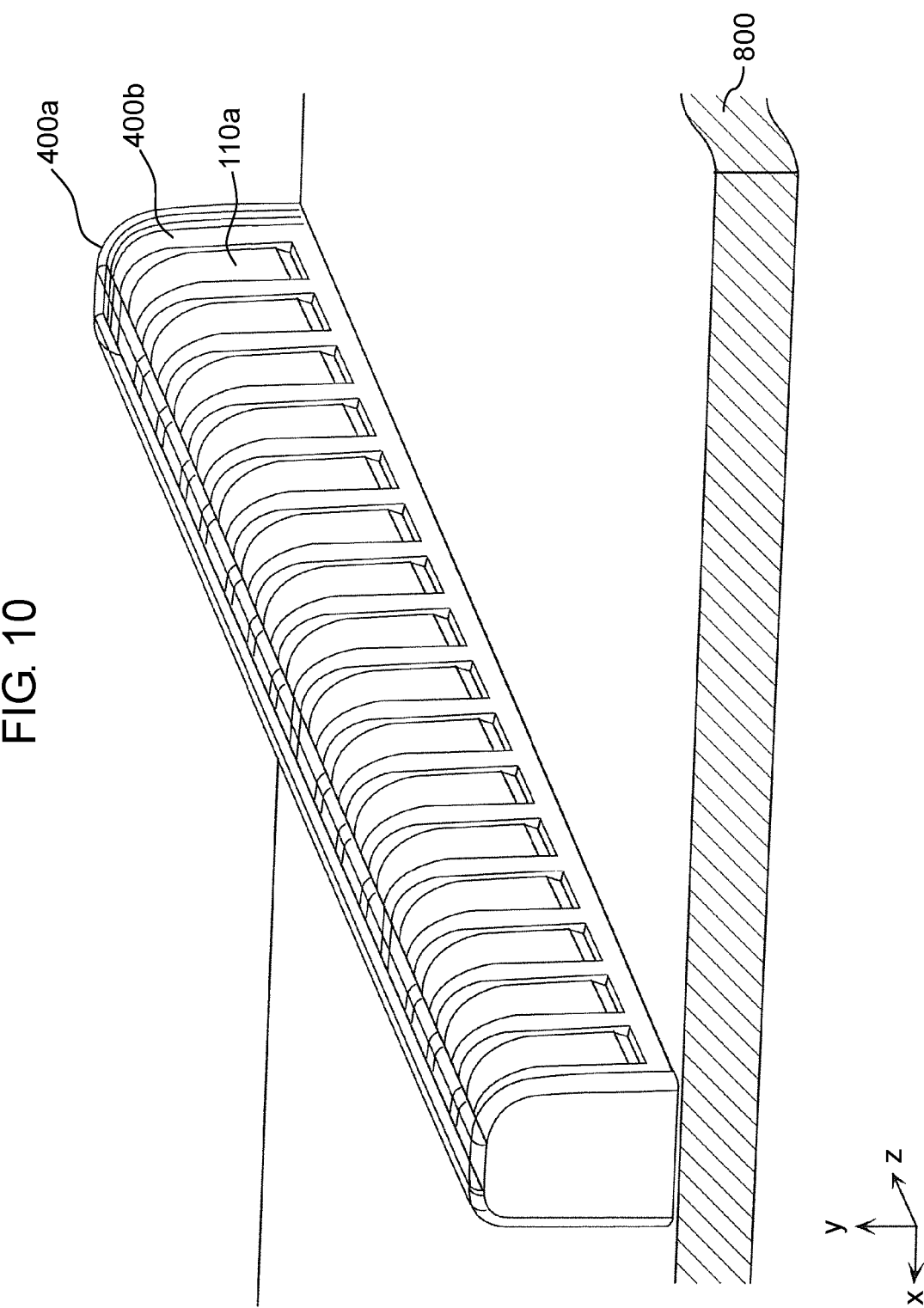
FIG. 10 is a transparent perspective view schematically illustrating one example of a part of the control device included in the control apparatus according to the second modification of the first exemplary embodiment.

FIG. 10 is a transparent perspective view schematically illustrating one example of a part of the control device included in control apparatus 10 according to the second modification of the first exemplary embodiment. FIG. 10 is a transparent perspective view of a portion where function switch unit 110 in assembled control device 2100 is electrically isolated from the periphery thereof, wherein the inside of rubber cap 400a is seen through rubber cap 400a.

In assembled control device 2100, rubber cap 400a covers switch 110AB composed of movable contactor 110a and fixed contactor 110b. Rubber cap 400a covers switch 110AB such that protruding part 120b of label body 120 mounted to control device 2100 is not in direct contact with switch 110AB. Thus, label body 120 is electrically isolated from function switch unit 110 in control device 2100.

Housing 400b has a plurality of walls (see FIG. 9) each of which is stored in a gap between adjacent movable contactors 110a in assembled control device 2100, and electrically isolates adjacent switches 110AB from each other by these walls.

A mechanism in which insulating member 400 thus configured suppresses an impact of static electricity on function switch unit 110 will be described in detail with reference to sectional views.

Figure 11A:
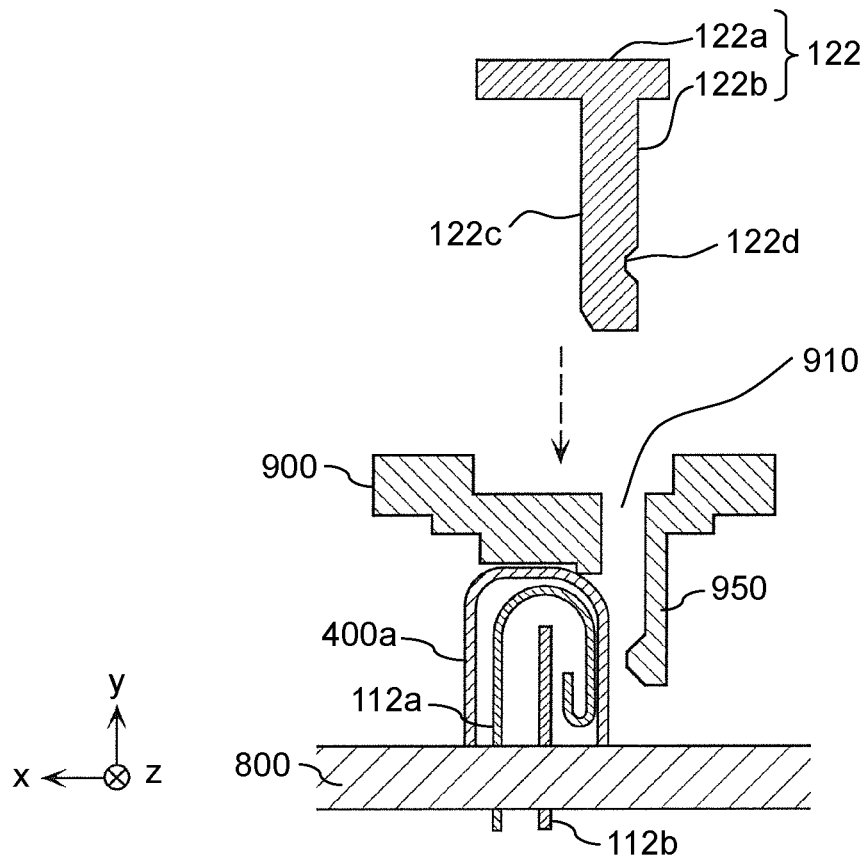
FIG. 11A is a sectional view schematically illustrating one example of a part of the control device included in the control apparatus according to the second modification of the first exemplary embodiment.
Figure 11B:
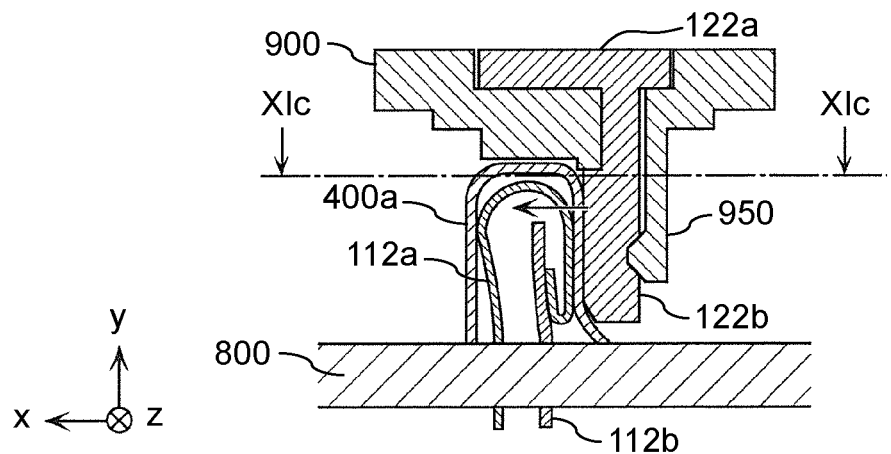
FIG. 11B is a sectional view schematically illustrating one example of a part of the control device included in the control apparatus according to the second modification of the first exemplary embodiment.

FIGS. 11A and 11B are sectional views schematically illustrating one example of a part of control device 2100 included in control apparatus 10 according to the second modification of the first exemplary embodiment.

The direction of the cut surface in FIGS. 11A and 11B is substantially the same as in FIGS. 4A and 4B. As in FIG. 4A, FIG. 11A illustrates a state before label body 120 (label body 122 in the example in FIG. 11A) is mounted to control device 2100 (housing 900), and as in FIG. 4B, FIG. 11B illustrates a state where label body 120 (label body 122 in the example in FIG. 11B) is mounted to control device 2100 (housing 900).

Label body 122 is mounted to control device 2100 (housing 900) as illustrated in FIG. 11B by inserting protruding part 122b into hole 910 in housing 900 in the negative direction of the y axis as indicated by a broken line arrow in FIG. 11A.

When label body 122 is mounted to control device 2100 (housing 900), rubber cap 400a is pressed in the positive direction of the x axis by rib 122c on protruding part 122b of label body 122 as indicated by a solid arrow in FIG. 11B. Because rubber cap 400a is made of an elastic body such as silicon rubber as described above, at least a partial area of rubber cap 400a displaces due to such pressure. Specifically, rib 122c on protruding part 122b can displace at least a partial area of rubber cap 400a as illustrated in FIG. 11B, and thus can press movable contactor 112a in the positive direction of the x axis through rubber cap 400a. Accordingly, in switch 110AB, the movable part of movable contactor 112a displaces in the direction (positive direction of the x axis) indicated by the solid arrow in FIG. 11B to come in contact with fixed contactor 112b.

In this way, in control device 2100 in the present modification, switch 110AB is set to be in an open state or a closed state depending on the presence of rib 122c as in the first exemplary embodiment, even after rubber cap 400a is attached. In addition, switch 110AB is electrically isolated from label body 122 and housing 900 by rubber cap 400a having insulating properties, whereby an impact of static electricity on control device 2100 from the outside can be suppressed in the present modification.

It is to be noted that rib 122c formed on protruding part 122b is set such that the displacement of rubber cap 400a falls within the elasticity range of rubber cap 400a. Therefore, when label body 122 is removed from control device 2100 (housing 900), the displacing area of rubber cap 400a by rib 122c returns to an original position by its own elastic force. Then, the movable part of movable contactor 112a also returns to an original position as described in the first exemplary embodiment.

The portion of rubber cap 400a displacing by being pressed by rib 122c formed on protruding part 122b includes not only a portion in contact with rib 122c but also a peripheral portion around the portion in contact with rib 122c. Therefore, movable contactor 112a disposed on a position corresponding to an area of protruding part 122b where rib 122c is not formed may be accidentally pressed by the displacing peripheral portion. Housing 400b is provided to prevent the occurrence of such a situation.

Figure 11C:
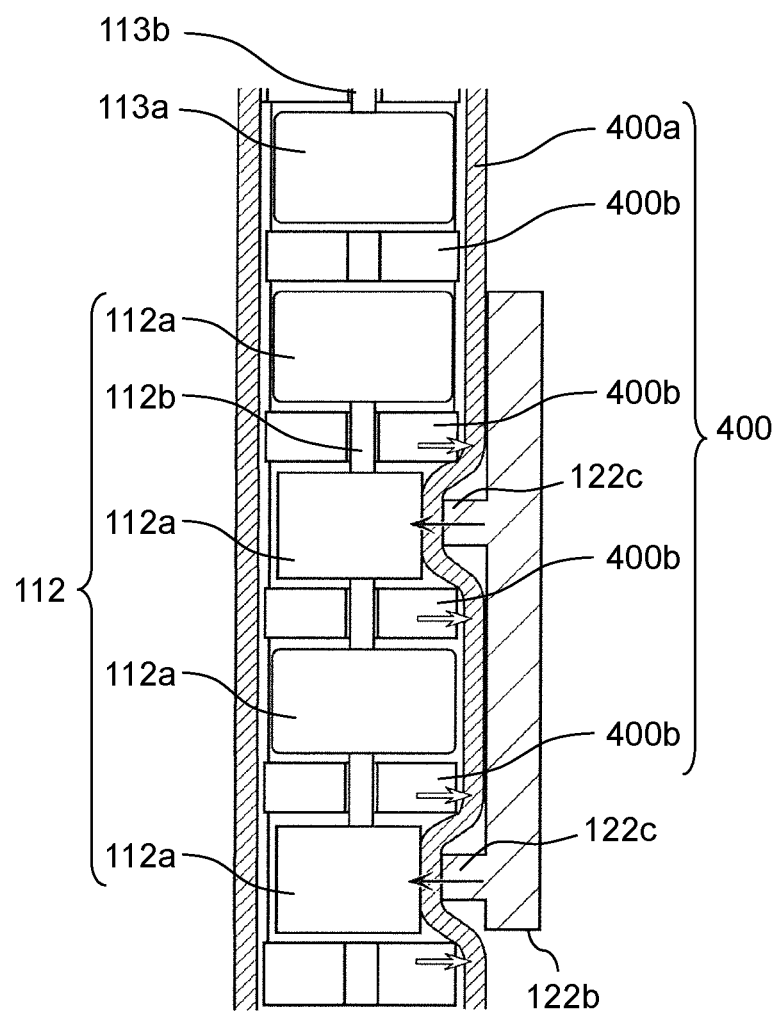
FIG. 11C is a sectional view schematically illustrating one example of a part of the control device included in the control apparatus according to the second modification of the first exemplary embodiment.

FIG. 11C is a sectional view schematically illustrating one example of a part of the control device included in control apparatus 10 according to the second modification of the first exemplary embodiment. FIG. 11C illustrates a part of a cross section of assembled control device 2100 on a cut surface along line XIc-XIc in FIG. 11B.

As illustrated in FIG. 11C, the walls of housing 400b are present in gaps between adjacent movable contactors 110a (in the example in FIG. 11C, gaps between adjacent movable contactors 112a and the gap between movable contactor 112a and movable contactor 113a which are adjacent to each other). Each of the walls of housing 400b electrically isolates adjacent switches 110AB from each other.

Fixed contactors 110b are disposed in slits (see FIG. 9) formed on the walls of housing 400b. However, the shape of fixed contactor 110b is not limited at all to the illustrated shape. For example, fixed contactor 110b may have a shape separated by walls of housing 400b, like movable contactors 110a.

Further, the contacts of switches 110AB adjacent to each other are electrically isolated from each other by the wall of housing 400b. In the present disclosure, the configuration described above is depicted such that housing 400b electrically isolates adjacent switches 110AB from each other.

As illustrated in FIG. 11C, two ribs 122c formed on protruding part 122b of label body 122 mounted to control device 2100 presses rubber cap 400a in the positive direction of the x axis (the direction indicated by the solid arrow in FIG. 11C). Movable contactors 112a disposed at positions corresponding to ribs 122c are pressed by ribs 122c through rubber cap 400a and displace in the positive direction of the x axis with the displacement of rubber cap 400a. Thus, movable contactors 112a are in contact with fixed contactor 112b.

At that time, peripheral portions around the portion of rubber cap 400a in contact with rib 122c also displace in the positive direction of the x axis due to the displacement of the portion in contact with rib 122c by pressure from rib 122c.

However, in control device 2100 according to the present modification, a portion of rubber cap 400a which is to displace is restricted by housing 400b in order to prevent these peripheral portions from pressing movable contactor 112a disposed at a position corresponding to the portion where rib 122c is not provided, as illustrated in FIG. 11C. Specifically, in control device 2100, housing 400b which separates switches 110AB from each other presses back rubber cap 400a pressed by rib 120c with a force (a force indicated by an outlined arrow in FIG. 11C) in a direction (in the example in FIG. 11C, the negative direction of the x axis) opposite to the predetermined direction (in the example in FIG. 11C, the positive direction of the x axis) in the state where label body 120 is mounted to control device 2100, whereby the size of the portion, which displaces by pressure from rib 120c, of rubber cap 400a is restricted.

Accordingly, in control device 2100, only movable contactor 112a disposed at the position corresponding to rib 122c is pressed by rib 122c formed on protruding part 122b, and movable contactor 112a disposed at the position corresponding to the portion where rib 122c is not provided is prevented from being accidentally pressed. Consequently, in control device 2100, the combination of open or closed states of respective switches 110AB included in respective function switch units 110 is appropriately set according to rib 122c formed on protruding part 122b.

Housing 400b is effective for a control device in which, due to the distance between switches 100AB adjacent to each other being relatively short, movable contactor 112a disposed at a position corresponding to a portion where rib 122c is not provided may be accidentally pressed due to the displacement of a partial area of rubber cap 400a by rib 122c. A control device in which, due to the distance between switches 100AB adjacent to each other being relatively long, movable contactor 112a disposed at a position corresponding to a portion where rib 122c is not provided is less likely to be accidentally pressed due to the displacement of a partial area of rubber cap 400a by rib 122c may not be provided with housing 400b.

[3-2. Effects]

As described above, in the second modification of the first exemplary embodiment, the control device may further include a first insulating member that electrically isolates the label body from the function switch unit. The first insulating member may be configured such that at least a partial area of the first insulating member may elastically displace in a predetermined direction when being pressed by the protruding part. The protruding part may press and displace at least one of the contactors of a plurality of switches in a predetermined direction by displacing at least the partial area of the first insulating member.

Control device 2100 is one example of the control device. Rubber cap 400a is one example of the first insulating member.

For example, in the example in the second modification of the first exemplary embodiment, control device 2100 further has rubber cap 400a that electrically isolates label body 120 from function switch unit 110, in addition to the configuration of control device 100 described in the first exemplary embodiment. At least a partial area of rubber cap 400a elastically displaces in the predetermined direction (for example, in the positive direction of the x axis) when rubber cap 400a is pressed by rib 120c formed on protruding part 120b. Rib 120c of protruding part 122b presses at least one of movable contactors 110a in a plurality of switches 110AB included in function switch unit 110 and displaces the at least one of movable contactors 110a in the predetermined direction (for example, in the positive direction of the x axis) by displacing at least the partial area of rubber cap 400a.

Thus, in control device 2100, switch 110AB is electrically isolated from label body 122 and housing 900 by rubber cap 400a having insulating properties, whereby an impact of static electricity (for example, static electricity charged in the user) on control device 2100 from the outside can be suppressed.

The control device may also include a second insulating member that separates the plurality of switches from each other. The second insulating member may restrict a size of an area, which displaces by pressure from the protruding part, in the first insulating member by pushing back the first insulating member pressed by the protruding part with a force in a direction opposite to the predetermined direction.

Housing 400b is one example of the second insulating member.

For example, in the example in the second modification of the first exemplary embodiment, control device 2100 further includes housing 400b that separates the plurality of switches 110AB from each other. Housing 400b restricts a size of an area, which displaces by pressure from rib 120c, by pushing back rubber cap 400a pressed by rib 120c formed on protruding part 120b with a force in a direction (for example, the negative direction of the x axis) opposite to the predetermined direction (for example, the positive direction of the x axis).

Accordingly, in control device 2100, only movable contactor 110a disposed at the position corresponding to rib 120c formed on protruding part 120b is pressed by rib 120c, and movable contactor 110a disposed at the position corresponding to the area where rib 120c is not provided is prevented from being accidentally pressed by a displacing partial area of rubber cap 400a. Consequently, in control device 2100, the combination of open or closed states of respective switches 110AB included in respective function switch units 110 is appropriately set according to rib 120c formed on protruding part 120b.

Second Exemplary Embodiment

A second exemplary embodiment will be described below with reference to FIGS. 12 to 13B.

[4-1. Configuration]

A control device according to the present exemplary embodiment has a function switch unit having a configuration different from the configuration of function switch unit 110 included in the control devices in the first exemplary embodiment and the respective modifications of the first exemplary embodiment. However, the other configurations of the control device in the present exemplary embodiment are substantially the same as those of the control devices described in the first exemplary embodiment and the respective modifications of the first exemplary embodiment. The present exemplary embodiment will be described below, focusing on differences from function switch unit 110 described in the first exemplary embodiment. An appearance of the control device in the present exemplary embodiment is substantially the same as the appearance of control device 100 described in the first exemplary embodiment, and therefore, it will not be described below.

Figure 12:
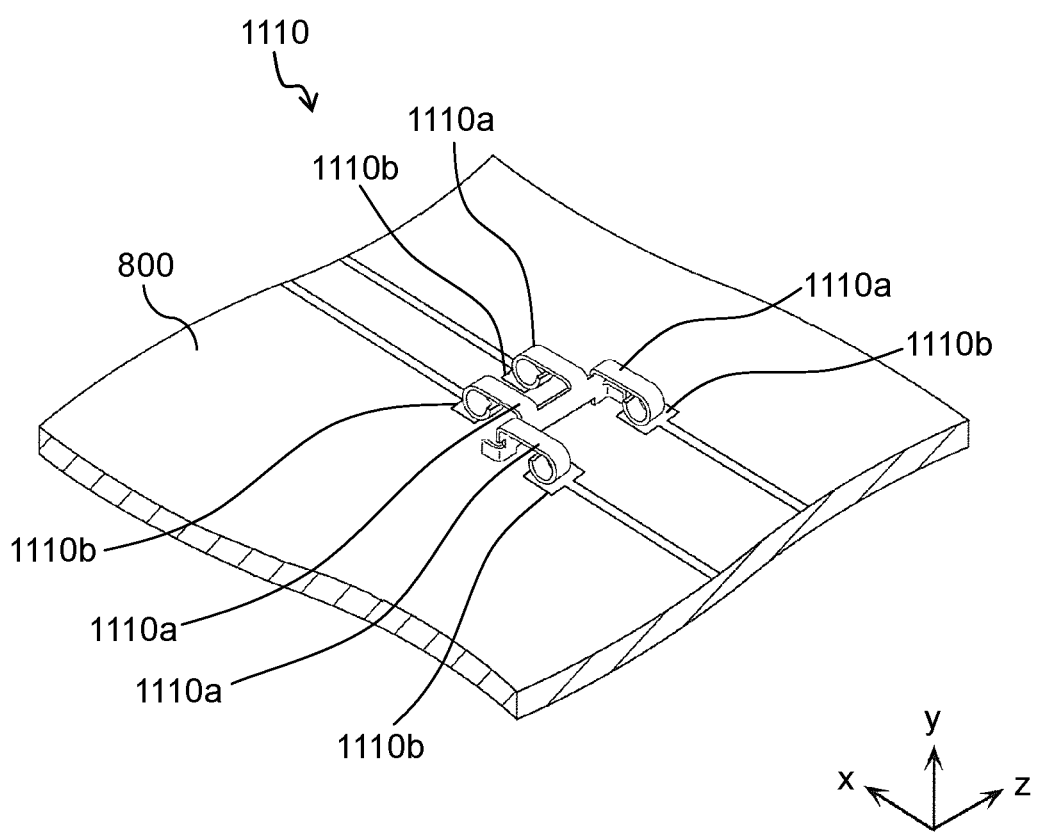
FIG. 12 is a perspective view schematically illustrating one example of a function switch unit provided to a control device according to a second exemplary embodiment.

FIG. 12 is a perspective view schematically illustrating one example of function switch unit 1110 provided to the control device according to the second exemplary embodiment.

FIG. 12 illustrates single function switch unit 1110, and single function switch unit 1110 functionally corresponds to single function switch unit 110 described in the first exemplary embodiment. Therefore, in the control device described in the second exemplary embodiment, single function switch unit 1110 is basically assigned to single operation unit, such as a key, to which a function is assigned.

Function switch unit 1110 is provided with a plurality of (four, for example) movable contactors 1110a. In function switch unit 110 described in the first exemplary embodiment, movable contactors 110a included in single function switch unit 110 are one-dimensionally arranged on substrate 800 along the z axis direction in the same attitude. Movable contactors 1110a in the present exemplary embodiment include movable contactors 1110a having multiple different types (for example, two types) of attitudes, and they are two-dimensionally arranged on substrate 800 along an x-z plane. The direction of displacement of the movable part of movable contactor 1110a is the y axis direction in FIG. 12, which is the same as a direction in which the label body is inserted. Function switch unit 1110 is different in these points from function switch unit 110 in the first exemplary embodiment.

FIG. 12 also illustrates a plurality of fixed contactors 1110b. Different from fixed contactor 110b included in function switch unit 110 in the first exemplary embodiment, fixed contactors 1110b are implemented as lands of wiring patterns on substrate 800.

Note that fixed contactors 1110b may not be included in function switch unit 1110. For example, lands for soldering wiring patterns on the substrate or a portion of wirings connected to other components may be used as fixed contactors 1110b.

In function switch unit 1110, a single switch which is switched between an open state and a closed state is composed of a pair of single movable contactor 1110a and single fixed contactor 1110b disposed at a position corresponding to movable contactor 1110a. This is similar to the first exemplary embodiment.

In the present exemplary embodiment, a label body has a configuration suitable for displacing the movable part of movable contactor 1110a when being mounted to the control device. This configuration is different from the configuration of label body 120 described in the first exemplary embodiment.

The label body in the present exemplary embodiment is substantially the same as label body 120 in the first exemplary embodiment in that it has a display part and a protruding part protruding from the display part and is mounted to housing 900 with a portion (surface) of the display part being exposed. However, the protruding part in the present exemplary embodiment is not configured to press the movable part by the rib projecting in the direction perpendicular to the insertion direction of the protruding part as described in the first exemplary embodiment, but is configured to press the movable part by a tip of the protruding part in the direction same as the insertion direction of the protruding part. Therefore, in the present exemplary embodiment, the protruding part is formed with a predetermined length (a length for appropriately pressing movable contactor 1110a) at a position corresponding to movable contactor 1110a when being mounted to housing 900 on a back surface of the display part of the label body. The example of the configuration of the label body in the present exemplary embodiment will be described later in detail with reference to FIGS. 13A and 13B.

As described above, the control device in the present exemplary embodiment is different in the configuration of the function switch unit and the configuration of the label body for determining a combination of open or closed states of a plurality of switches included in the function switch unit from control device 100 described in the first exemplary embodiment. However, the other configurations of the control device are substantially the same between the first exemplary embodiment and the second exemplary embodiment. Therefore, the block diagram illustrating one example of the configuration of control device 100 illustrated in FIG. 5 in the first exemplary embodiment can also be applied to the present exemplary embodiment. Accordingly, the configuration of the control device will not be described in the present exemplary embodiment.

[4-2. Operation of Function Switch Unit]

Next, a basic operation of function switch unit 1110 included in the control device according to the present exemplary embodiment will be described.

Figure 13A:
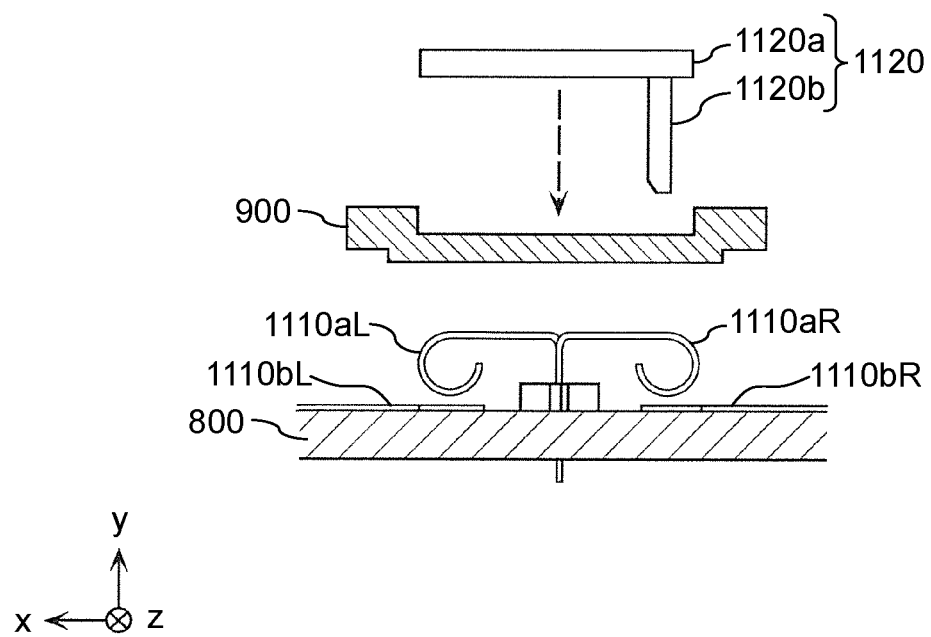
FIG. 13A is a sectional view schematically illustrating one example of a part of the control device included in the control apparatus according to the second exemplary embodiment.
Figure 13B:
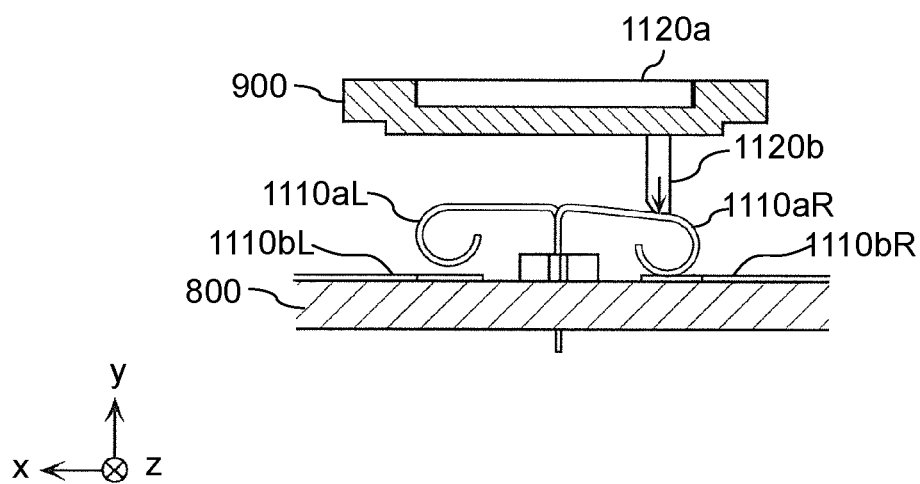
FIG. 13B is a sectional view schematically illustrating one example of a part of the control device included in the control apparatus according to the second exemplary embodiment.

FIGS. 13A and 13B are sectional views schematically illustrating one example of a part of the control device included in a control apparatus according to the second exemplary embodiment. FIGS. 13A and 13B illustrate sectional views in which a surface obtained by cutting between adjacent label bodies 1120 in the control device as illustrated in FIG. 1A or 1B along the x-y plane is viewed in the positive direction of the z axis.

When label body 1120 is not mounted to housing 900, movable contactor 1110a and fixed contactor 1110b are not in contact with each other as illustrated in FIG. 13A. In other words, a plurality of (four, for example) switches included in function switch unit 1110 are all in an open state in an initial state (a state where label body 1120 is not mounted to housing 900). Label body 1120 is mounted to the control device (housing) as illustrated in FIG. 13B by inserting protruding part 1120b into a hole (not illustrated) in housing 900 in the negative direction of the y axis as indicated by a broken line arrow in FIG. 13A.

In the example in FIGS. 13A and 13B, label body 1120 has protruding part 1120b corresponding to movable contactor 1110aR disposed on the right in FIG. 13B and does not have protruding part 1120b corresponding to movable contactor 1110aL disposed on the left in FIG. 13B. Therefore, when label body 1120 is mounted to the control device (housing), protruding part 1120b presses movable contactor 1110aR by the tip of protruding part 1120b in a direction (a direction indicated by a solid arrow in FIG. 13B, the negative direction of the y axis) same as the insertion direction of protruding part 1120b, thereby displacing the movable part of movable contactor 1110aR. Due to the displacement, movable contactor 1110aR and fixed contactor 1110bR are brought into contact with each other. In other words, the switch composed of movable contactor 1110aR and fixed contactor 1110bR is brought into a closed state.

On the other hand, label body 1120 does not have protruding part 1120b pressing movable contactor 1110aL. Therefore, movable contactor 1110aL does not come in contact with fixed contactor 1110bL, and therefore, the switch composed of movable contactor 1110aL and fixed contactor 1110bL remains in an open state.

As described above, label body 1120 according to the present exemplary embodiment determines a combination of open or closed states of a plurality of (four, for example) switches in function switch unit 1110 depending on the presence of protruding part 1120b that presses movable contactor 1110a in the direction same as the insertion direction of label body 1120.

[4-3. Effects and Others]

As described above, in the present exemplary embodiment, the control device is a control device for controlling an electronic device and includes: an output unit that outputs a signal for prompting the electronic device to execute a predetermined operation; a function switch unit that includes a plurality of switches each having a contactor formed such that at least a portion of the contactor is elastically displaceable in a predetermined direction, the switches each being switched between an open state and a closed state due to displacement of the at least a portion of the contactor in the predetermined direction; and a label body that has a display part and a protruding part protruding from the display part, the label body being mounted in a state where the protruding part is inserted into a hole in a housing and the display part is positioned on an outside of the housing. The protruding part of the label body determines a combination of open or closed states of the plurality of switches switched when the protruding part presses and displaces at least one of the contactors of the plurality of switches in the predetermined direction. The predetermined operation is determined according to the combination.

Key 500 is one example of the operation unit. Output unit 300 is one example of the output unit. Movable contactor 1110a is one example of the contactor. The switch composed of one movable contactor 1110a and one fixed contactor 1110b is one example of the switch that is switched between an open state and a closed state. Function switch unit 1110 is one example of the function switch unit. Display part 1120a is one example of the display part. Protruding part 1120b is one example of the protruding part. Housing 900 is one example of the housing. Label body 1120 is one example of the label body.

For example, in the example illustrated in the second exemplary embodiment, the control device for controlling an electronic device (for example, a TV receiver) includes key 500, output unit 300, function switch unit 1110, and label body 1120.

Key 500 is operated (for example, pressed) by a user.

Output unit 300 outputs a signal for prompting the electronic device (for example, TV receiver) to execute a predetermined operation in response to the operation (for example, depression) performed on the operation unit by the user.

Function switch unit 1110 includes a plurality of switches each having movable contactor 1110a formed such that at least a portion of movable contactor 1110a is elastically displaceable in a predetermined direction, the switch being switched between an open state and a closed state due to displacement of the at least a portion of movable contactor 1110a in the predetermined direction.

Label body 1120 has display part 1120a and protruding part 1120b protruding from display part 1120a, label body 1120 being mounted to the control device (housing 900) in a state where protruding part 1120b is inserted into a hole in housing 900 of the control device and display part 1120a is positioned on the outside of housing 900.

When label body 1120 is mounted to the control device (housing 900), protruding part 1120b of label body 1120 determines a combination of open or closed states of the plurality of switches switched when protruding part 1120b presses and displaces movable parts, which are at least a portion of at least one of movable contactors 1110a of the plurality of switches, in the predetermined direction (for example, the negative direction of the y axis). The predetermined operation (for example, "audio switching" or "display of internet connection screen") of the electronic device is determined according to the combination.

In the control device, the predetermined direction may be substantially the same as a direction in which the protruding part is inserted, and the protruding part may press and displace at least a portion of the contactor by a tip of the protruding part when the label body is mounted to the control device.

For example, the predetermined direction is substantially the same as the insertion direction of protruding part 1120b in the example described in the second exemplary embodiment. In addition, protruding part 1120b presses and displaces at least a portion of the contactor by the tip of protruding part 1120b, when label body 1120 is mounted to the control device (housing 900).

The control device thus configured enables the user to change the assignment of functions to the operation unit (for example, key 500) only by exchanging a plurality of label bodies (for example, label bodies 1120) for one another, as in control device 100 described in the first exemplary embodiment.

In addition, the present exemplary embodiment can also be modified such that the control device further includes an insertion detecting switch as in the first exemplary embodiment. For example, the insertion detecting switch may be provided between movable contactors 1110a. In addition, the present exemplary embodiment can also be modified to include a cover made of silicon rubber for electrically isolating function switch unit 1110 from label body 1120 to suppress an impact of static electricity.

The present exemplary embodiment can also be configured such that a function switch unit including a switch which is initially in a closed state is provided by using a switch and a protruding part which have a shape different from the shape illustrated in FIG. 12.

Third Exemplary Embodiment

A third exemplary embodiment will be described below with reference to FIGS. 14 to 19B.

[5-1. Configuration]

Control device 100A in the present exemplary embodiment has a configuration substantially the same as those of the control devices described in the first exemplary embodiment, the modifications of the first exemplary embodiment, and the second exemplary embodiment. However, control device 100A in the present exemplary embodiment is different from the control devices in the respective exemplary embodiments described above in that a label body retainer is further provided. The present exemplary embodiment will be described below, focusing on the label body retainer which is the difference from the configurations in the respective exemplary embodiments described above and configurations of respective components relating to the label body retainer in the control device or in a control apparatus. It should be noted that constituent elements in the present exemplary embodiment which are substantially identical to constituent elements in the above respective exemplary embodiments and respective modifications are denoted by identical reference numerals and will not be described below in some cases.

Figure 14:
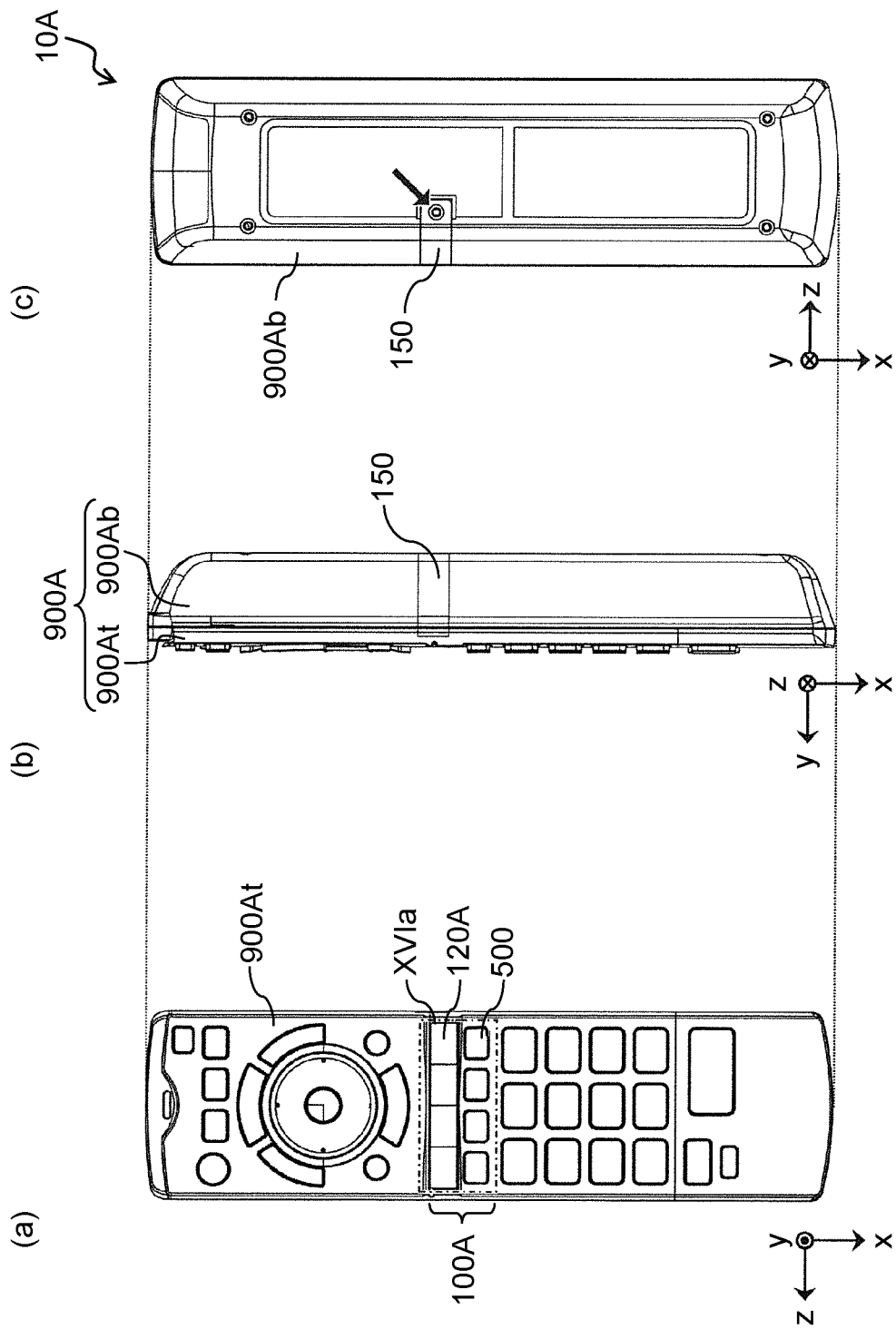
FIG. 14 is a view schematically illustrating one example of an appearance of a control apparatus including a control device according to a third exemplary embodiment.

FIG. 14 is a view schematically illustrating one example of an appearance of control apparatus 10A including control device 100A according to the third exemplary embodiment. Part (a) of FIG. 14 illustrates a plan view of control apparatus 10A, part (b) illustrates a right side view of control apparatus 10A, and part (c) illustrates a bottom view of control apparatus 10A.

Control apparatus 10A illustrated in FIG. 14 is a remote controller for wirelessly controlling an electronic device (for example, a TV receiver) which can be wirelessly controlled.

As illustrated in FIG. 14, control device 100A in the present exemplary embodiment includes key 500, label body 120A, and label body retainer 150, for example. Control device 100A also includes function switch unit 110A, label body retainer detecting switch 200A, insulating member 400A, microcomputer 600, memory 700, and output unit 300, which are not illustrated in FIG. 14. Among these components, key 500, microcomputer 600, memory 700, and output unit 300 are substantially the same as those described in the above respective exemplary embodiments and respective modifications, and they will not be described below. Regarding function switch unit 110A, label body 120A, and insulating member 400A, differences from the respective label bodies and the function switches in the above respective exemplary embodiments and modifications will be mainly described below.

Control device 100A is different in numbers of keys and label bodies (in the example in FIG. 14, the numbers of keys 500 and label bodies 120A are four, respectively) and locations where they are disposed on the control apparatus from the control devices described in the above respective exemplary embodiments and respective modifications. However, these differences do not have an impact on the effects of the present exemplary embodiments.

Control device 100A has label body retainer 150 illustrated in the right side view and bottom view of FIG. 14. Control device 100A is different in this point from control devices described in the above respective exemplary embodiments and respective modifications.

In the example in FIG. 14, label body retainer 150 is disposed in one area on a right side surface of housing 900A of control apparatus 10A composed of upper housing 900At and lower housing 900Ab. Label body retainer 150 is disposed at a position of housing 900A indicated by an arrow in the bottom view in part (c) of FIG. 14 and fixed to lower housing 900Ab by means of a screw. Label body retainer 150 is removable from housing 900A.

It is to be noted that FIG. 14 illustrates only a part of label body retainer 150 fixed to housing 900A of control apparatus 10A. Label body retainer 150 is fixed to housing 900A at an externally invisible portion so as to prevent four label bodies 120A from dropping off from upper housing 900At.

Next, label body 120A secured by label body retainer 150 will be described.

Figure 15A:
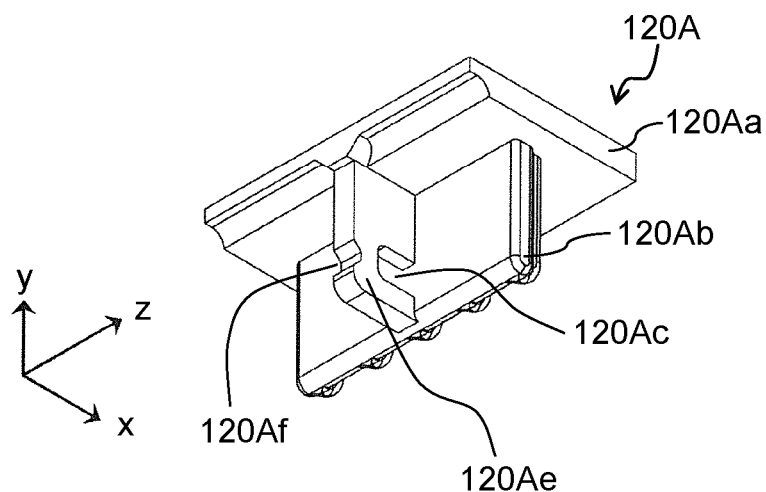
FIG. 15A is a perspective view schematically illustrating one example of a label body according to the third exemplary embodiment.
Figure 15B:
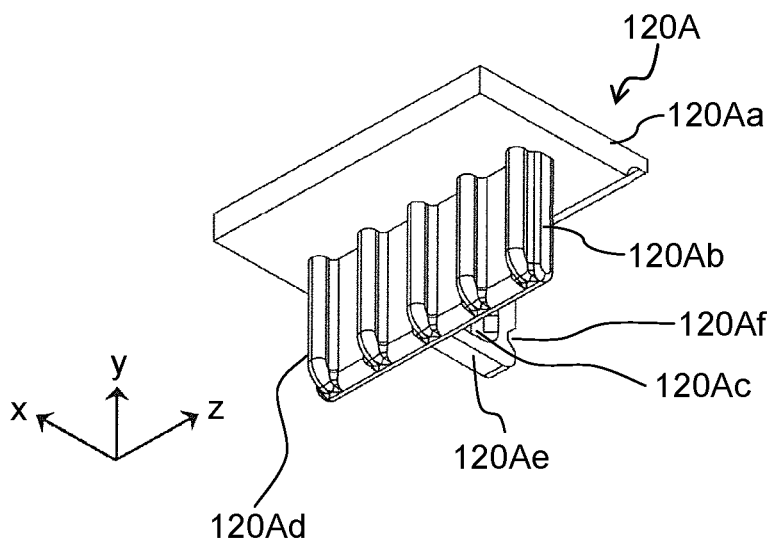
FIG. 15B is a perspective view schematically illustrating one example of the label body according to the third exemplary embodiment.
Figure 15C:
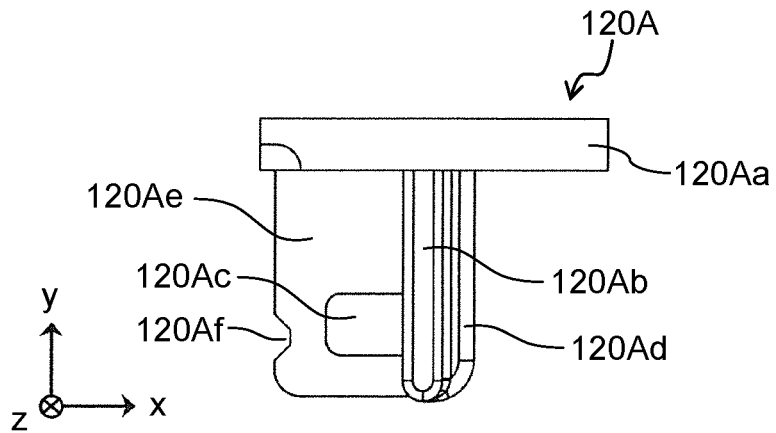
FIG. 15C is a side view schematically illustrating one example of the label body according to the third exemplary embodiment.

FIGS. 15A and 15B are perspective views schematically illustrating an example of label body 120A according to the third exemplary embodiment. FIG. 15C is a side view schematically illustrating an example of label body 120A according to the third exemplary embodiment. FIGS. 15A to 15C are presented for the description of one example of a configuration of label body 120A. FIGS. 15A and 15B are perspective views of label body 120A viewed in different directions, and FIG. 15C is a left side view.

Label body 120A has display part 120Aa and protruding part 120Ab protruding from display part 120Aa. The basic configuration of label body 120A is substantially the same as label body 120 and label body 1120 described in the above exemplary embodiments. As in the above exemplary embodiments, label body 120A is mounted to control device 100A (housing 900A) in a state where protruding part 120Ab is inserted in a hole formed in housing 900A and display part 120Aa is positioned on the outside of housing 900A.

A display indicating a function which is one of functions of an electronic device controlled by using control device 100A and associated with a number of later-described ribs 120Ad and arrangement positions of ribs 120Ad is provided on an upper surface of display part 120Aa. This display is formed by characters, symbols, graphics, or a combination thereof, for example.

In addition, a configuration in which label body 120A has ribs 120Ad projecting in the positive direction of the x axis on the side surface of protruding part 120Ab in the positive direction of the x axis is substantially the same as label body 120 described in the above exemplary embodiments. A configuration in which ribs 120Ad are involved with the assignment of functions to respective keys 500 set by using later-described function switch unit 110A is also substantially the same as label body 120 described in the above exemplary embodiments. Specifically, in control device 100A, a function to be assigned to key 500 corresponding to label body 120 is determined depending on the presence of all of or one or more of five ribs 120Ad (that is, depending on the number of ribs 120Ad and the arrangement positions of ribs 120Ad) arranged in line at approximately equal intervals illustrated in FIGS. 15A and 15B.

One of differences between label body 120A and label body 120 is that protruding part 120Ab has through-hole 120Ac. Through-hole 120Ac formed in label body 120A is one example of the through-hole formed in the label body in the present exemplary embodiment. Through-hole 120Ac is a hole formed in protruding part 120Ab along a direction (in the example in FIGS. 15A to 15C, the z axis direction) intersecting a direction in which protruding part 120Ab inserted into housing 900A is removed from housing 900A. In the example in FIGS. 15A to 15C, through-hole 120Ac is formed to penetrate rib 120Ae projecting in the negative direction of the x axis on the side surface of protruding part 120Ab in the negative direction of the x axis (the side surface on the opposite side of protruding part 120Ab from the surface where ribs 120Ad are provided).

In the configuration example in FIGS. 15A to 15C, recess 120Af on rib 120Ae is formed for substantially the same purpose as the engagement section (for example, recess 122d) which is provided to label body 120 described in the first exemplary embodiment and is engaged with protruding part 950 of housing 900.

In the present exemplary embodiment, four label bodies 120A as described above are arranged in line in the z axis direction and inserted into a through-hole formed in housing 900A (upper housing 900At).

Next, a process for assembling the respective components of control device 100A including a process for attaching label body 120A to upper housing 900At will be described with reference to FIGS. 16A to 16D, 17A, and 17B.

Figure 16A:
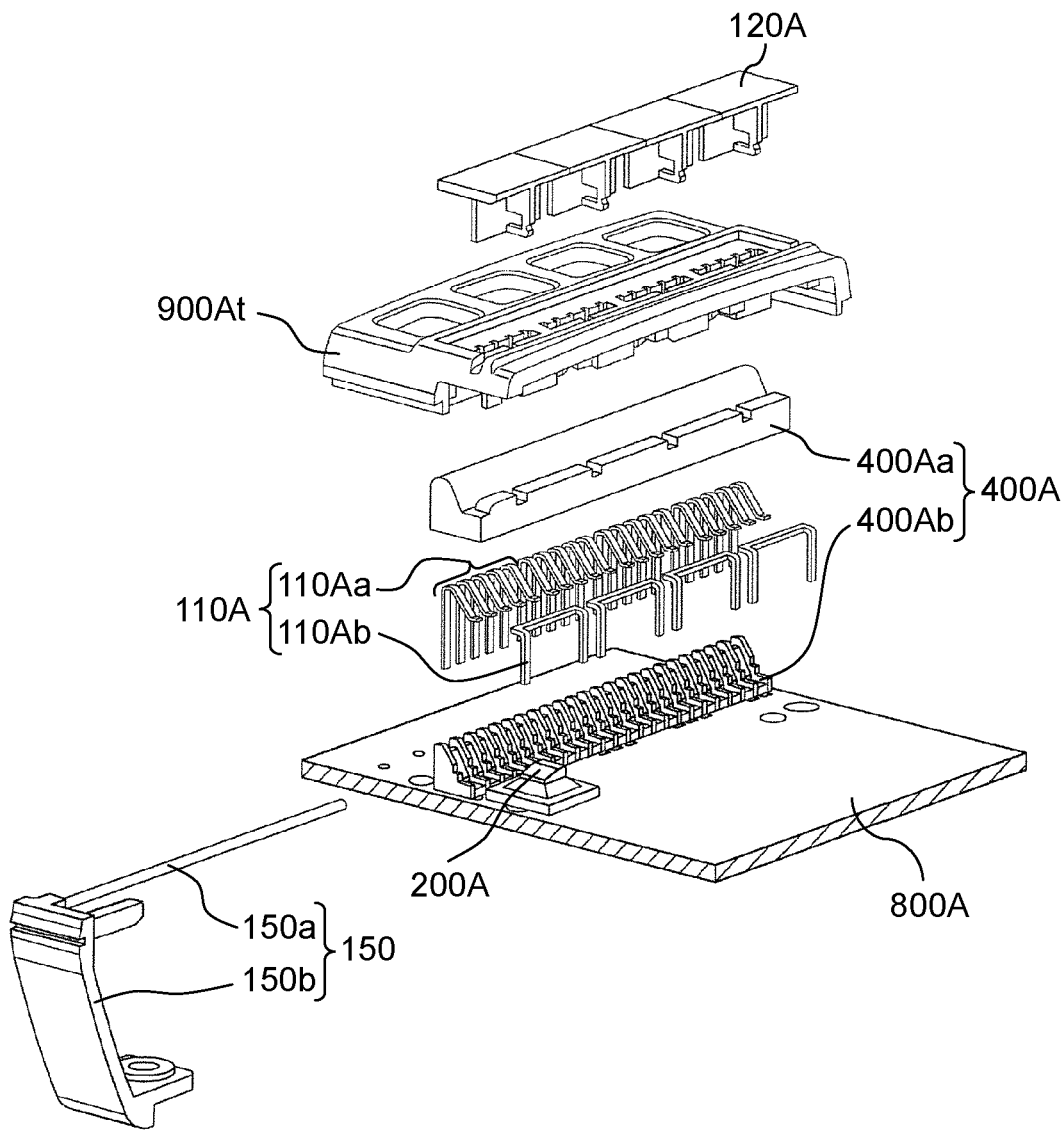
FIG. 16A is an exploded perspective view schematically illustrating one example of a part of the control device according to the third exemplary embodiment.

FIG. 16A is an exploded perspective view schematically illustrating an example of a part of control device 100A according to the third exemplary embodiment. An area illustrated in the exploded perspective view of FIG. 16A corresponds to area XVIa enclosed by a dot-and-dash line in FIG. 14. The components which are invisible in FIG. 14 and disposed inside control apparatus 10A will be described with reference to FIG. 16A.

Function switch unit 110A includes, as a pair, a plurality of movable contactors 110Aa and fixed contactors 110Ab mounted to substrate 800A of control apparatus 10A. The operation and function of these components are substantially the same as movable contactor 110a and fixed contactor 110b described in the first exemplary embodiment, and they will not be described in detail below.

However, movable contactor 110Aa is separated from fixed contactor 110Ab by being pressed and displaced by rib 120Ad on protruding part 120Ab of label body 120A mounted to housing 900A. Movable contactor 110Aa is different in this point from movable contactor 110a which is brought into contact with fixed contactor 110b by being pressed and displaced by rib 120c provided to protruding part 120b of label body 120 mounted to housing 900. In other words, function switch unit 110A is in a closed state in an initial state (where label body 120A is not mounted to housing 900A), while function switch unit 110 is in an open state in an initial state (where label body 120 is not mounted to housing 900). The configuration in which function switch unit 110A is in a closed state in the initial state is not a unique feature of the present exemplary embodiment, and this configuration is applicable to the above respective exemplary embodiments and respective modifications.

Insulating member 400 includes rubber cap 400Aa and housing 400Ab. The operation and function of these components are substantially the same as rubber cap 400a and housing 400b described in the second modification of the first exemplary embodiment, and they will not be described in detail below.

Label body retainer 150 has through member 150a and fixing part 150b.

Fixing part 150b illustrated also in parts (b) and (c) of FIG. 14 is a member for fixing label body retainer 150 attached to control device 100A to housing 900A. In the example in parts (b) and (c) of FIG. 14, fixing part 150b is formed to be externally flush with housing 900A when label body retainer 150 is fixed to housing 900A by means of fixing part 150b. This configuration prevents fingers of the user, for example, from being caught by label body retainer 150 attached to housing 900A while the user uses control apparatus 10A. In addition, an impact on the appearance of control apparatus 10A by label body retainer 150 attached to housing 900A can be reduced. Fixing part 150b may be formed by using a resin such as acrylonitrile-butadiene-styrene resin (ABS resin) as a material, or may be formed from a material same as the material of housing 900A.

Through member 150a is formed to have a length and a thickness enough for through member 150a to penetrate through-hole 120Ac formed in label body 120A. Through member 150a is made of a metal such as stainless steel or a resin, for example. Through member 150a penetrates through-hole 120Ac in label body 120A mounted to control device 100A.

A procedure for mounting label body 120A and label body retainer 150 to control device 100A will be described with reference to FIG. 16B.

Figure 16B:
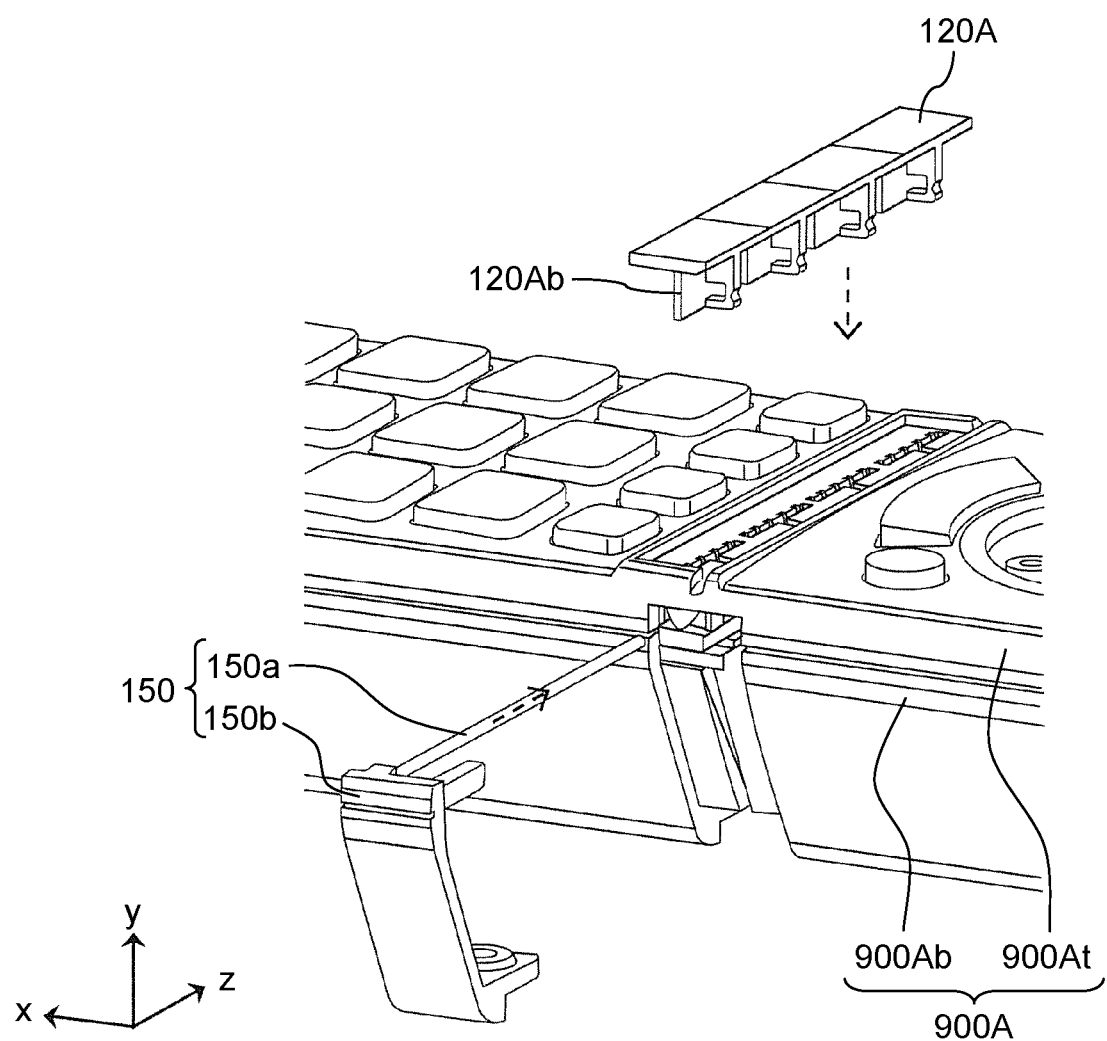
FIG. 16B is a view schematically illustrating one example of a procedure for mounting the label body and a label body retainer to the control device according to the third exemplary embodiment.

FIG. 16B is a view schematically illustrating one example of the procedure for mounting label body 120A and label body retainer 150 to control device 100A according to the third exemplary embodiment.

In the example in FIG. 16B, label body 120A is first mounted to housing 900A by inserting protruding part 120Ab on label body 120A into the hole formed in the upper surface of housing 900A in the negative direction of the y axis. Next, long through member 150a of label body retainer 150 is inserted from its tip into a hole formed in the right side surface of housing 900A in the positive direction of the z axis. Thus, label body retainer 150 is mounted to housing 900A.

A positional relation among respective components of control device 100 with label body retainer 150 being mounted to housing 900A will be described with reference to FIGS. 16C and 16D.

Figure 16C:
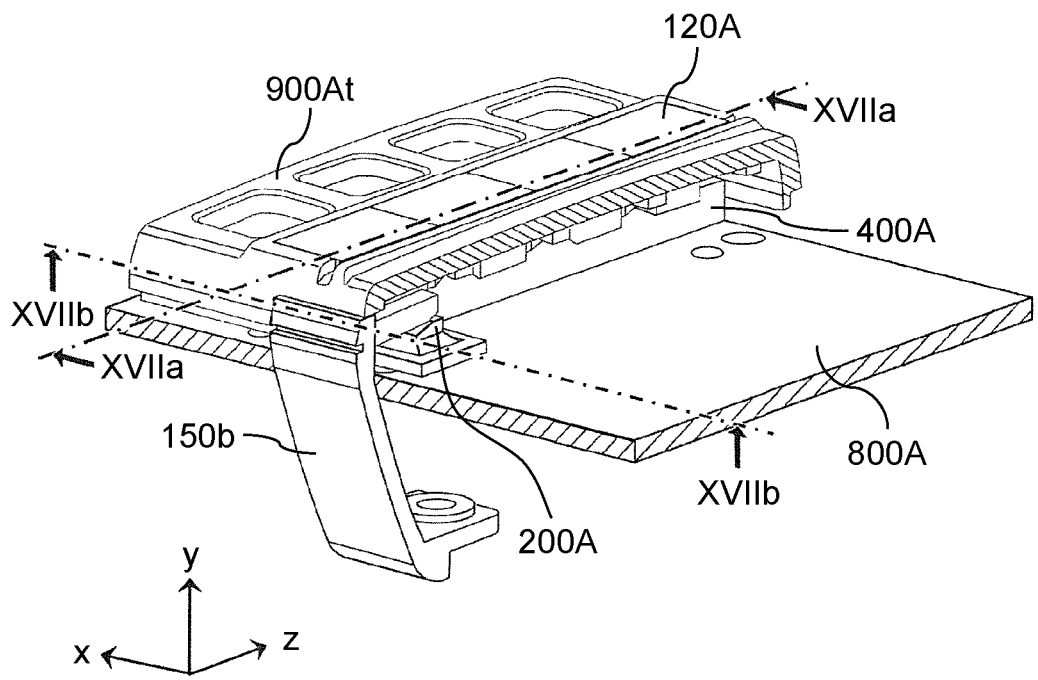
FIG. 16C is a perspective view schematically illustrating one example of a part of the control device according to the third exemplary embodiment.
Figure 16D:
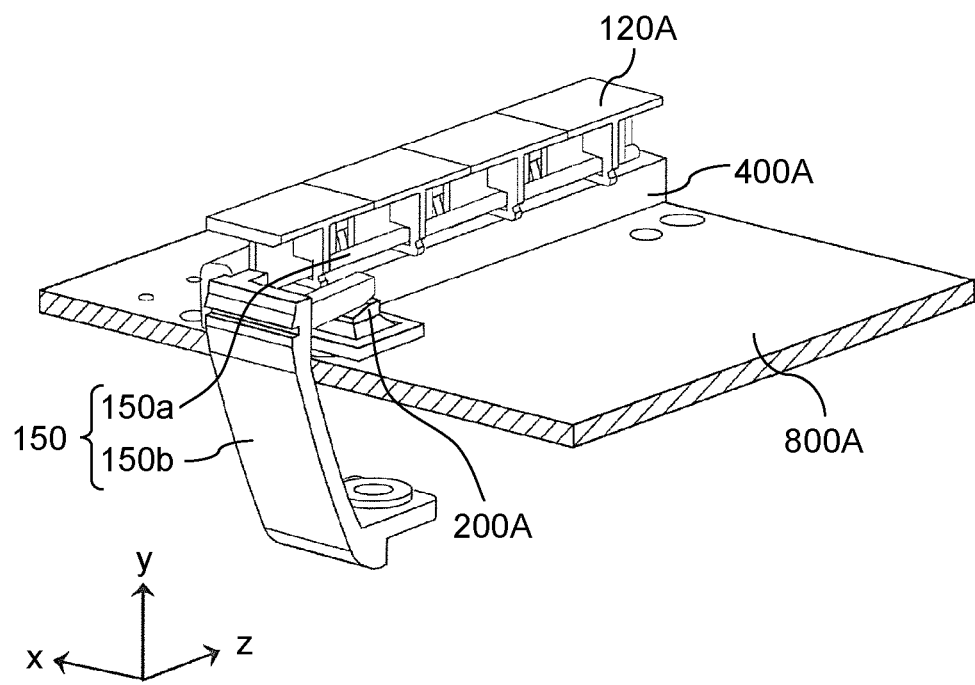
FIG. 16D is a perspective view schematically illustrating one example of a part of the control device according to the third exemplary embodiment.

FIGS. 16C and 16D are perspective views schematically illustrating one example of a part of control device 100A according to the third exemplary embodiment. FIG. 16C illustrates an internal structure of control device 100A after label body 120A and label body retainer 150 are mounted to housing 900A in the procedure illustrated in FIG. 16A. Hereinbelow, control device 100A in this state may also be referred to as assembled control device 100A. FIG. 16D illustrates a perspective view in which upper housing 900At is removed from the perspective view of control device 100A illustrated in FIG. 16C.

As illustrated in FIGS. 16C and 16D, in assembled control device 100A, label body retainer 150 is pushed into housing 900A until the surface of fixing part 150b is flush with the surface of housing 900A. Through member 150a at that time is inserted into housing 900A and penetrates all through-holes 120Ac of four label bodies 120A mounted to control device 100A.

The positional relation between through member 150a in the state illustrated in FIG. 16D and other components will be described with reference to FIGS. 17A and 17B.

Figure 17A:
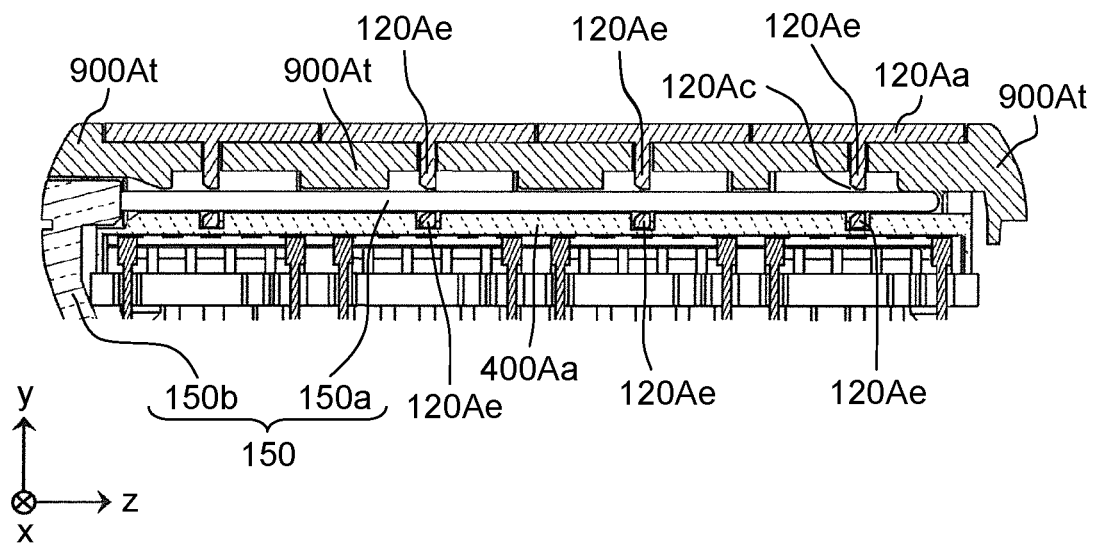
FIG. 17A is a sectional view schematically illustrating one example of a structure of the control device according to the third exemplary embodiment.
Figure 17B:
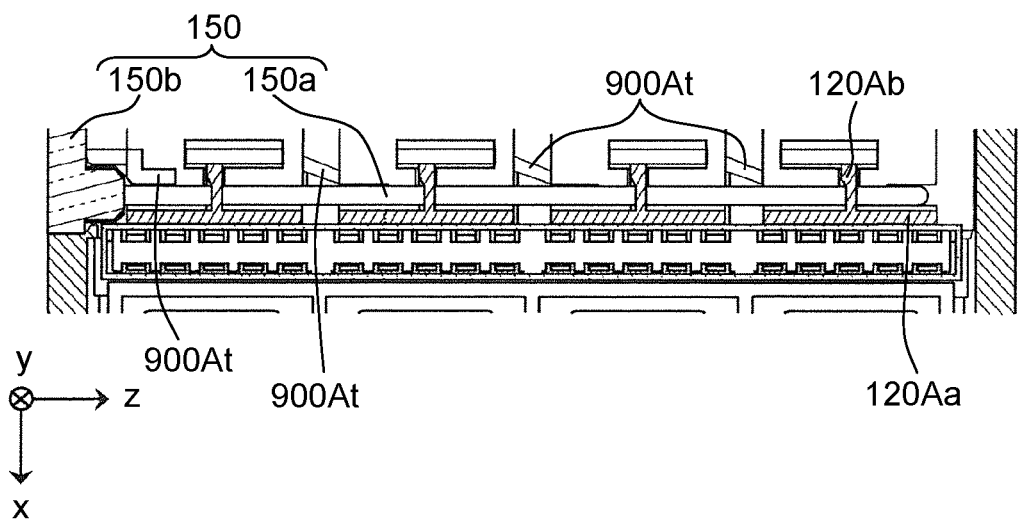
FIG. 17B is a sectional view schematically illustrating one example of the structure of the control device according to the third exemplary embodiment.

FIGS. 17A and 17B are sectional views of assembled control device 100A illustrated in FIG. 16C for schematically illustrating one example of the structure of control device 100A according to the third exemplary embodiment.

FIG. 17A is a sectional view of a cut surface of control device 100A along line XVIIa-XVIIa illustrated in FIG. 16C, and FIG. 17B is a sectional view of a cut surface of control device 100A along line XVIIb-XVIIb illustrated in FIG. 16C.

As illustrated in FIGS. 17A and 17B, in assembled control device 100A, through member 150a penetrates through-holes 120Ac formed in ribs 120Ae formed on respective protruding parts 120Ab of four label bodies 120A. Between through-holes 120Ac of adjacent label bodies 120A, through member 150a is disposed between upper housing 900At present above through member 150a (in the positive direction of the y axis) and rubber cap 400Aa present below through member 150a (in the negative direction of the y axis). To facilitate the insertion of through member 150a, guides for regulating the direction of movement of through member 150a are provided on upper housing 900At near an insertion opening of through member 150a (on the left in FIGS. 17A and 17B) and between ribs 120Ae of adjacent label bodies 120A. Leader lines for reference sign 900At in FIG. 17B indicate these guides.

As illustrated in FIGS. 16C to 17B, through member 150a penetrating through-holes 120Ac in respective label bodies 120A restricts the movement of protruding parts 120Ab in the direction in which protruding parts 120Ab are removed from housing 900A. Accordingly, label body 120A is prevented from dropping off from control device 100A in control apparatus 10A.

In addition, in the above respective exemplary embodiments and respective modifications, label body 120 is prevented from dropping off from housing 900 only by the engagement between protruding part 950 of housing 900 and the engagement section (for example, recess 122d). Therefore, the engagement between protruding part 950 and the engagement section is required to have a strength enough for preventing label body 120 from dropping off. On the other hand, in the present exemplary embodiment, label body 120A is prevented from dropping off from housing 900A by not only the engagement between protruding part 950 of housing 900A and the engagement section (recess 120Af on rib 120Ae) but also the restriction of movement of label body 120A by through member 150a. Accordingly, in control device 100A, the engagement between protruding part 950 and the engagement section (recess 120Af) may have a strength just enough for label body 120A to be temporarily fixed to housing 900A (just enough for label body 120A to be lightly fixed to housing 900A until through member 150a is inserted into through-hole 120Ac), for example. Specifically, in the present exemplary embodiment, the engagement between protruding part 950 and the engagement section (recess 120Af) may be lighter (weaker) as compared to the above respective exemplary embodiments and respective modifications. Thus, the user using control device 100A in the present exemplary embodiment can insert label body 120A into the hole formed in housing 900A or remove label body 120A from housing 900A with a weaker force, as compared to the above respective exemplary embodiments and respective modifications.

Control device 100A also has label body retainer detecting switch 200A provided on substrate 800A as illustrated in FIG. 16A. As understood from the comparison of FIG. 16A with FIGS. 16C and 16D, in assembled control device 100A, a portion of label body retainer detecting switch 200A is pressed by fixing part 150b of label body retainer 150 and displaces downward (in the negative direction of the y axis). Label body retainer detecting switch 200A is different in appearance from insertion detecting switch 200 described in the first modification of the first exemplary embodiment. However, the function and basic configuration of label body retainer detecting switch 200A are substantially the same as those of insertion detecting switch 200 described in the first modification of the first exemplary embodiment, and therefore, they will not be described in detail below.

Open and closed states of label body retainer detecting switch 200A are switched between a state where label body retainer detecting switch 200A does not displace without being pressed by fixing part 150b of label body retainer 150 and a state where a portion thereof displaces by being pressed by fixing part 150b. Microcomputer 600 can detect whether label body retainer 150 is attached to control device 100A by detecting the open state or closed state.

Control device 100A performs detection of whether label body retainer 150 is attached to control device 100A instead of performing detection of whether respective label bodies 120 are mounted to control device 1100 in the first modification of the first exemplary embodiment.

Specifically, in control device 100A, when the open or closed state of label body retainer detecting switch 200A indicates that label body retainer 150 is attached to control device 100A (for example, when label body retainer detecting switch 200A is in a closed state), microcomputer 600 causes output unit 300 to output a signal indicating a predetermined code (a code corresponding to key 500 operated by the user) in response to an operation performed by the user on key 500. On the other hand, when the open or closed state of label body retainer detecting switch 200A indicates that label body retainer 150 is not attached to control device 100A (for example, when label body retainer detecting switch 200A is in an open state), microcomputer 600 does not perform an operation for causing output unit 300 to output the signal indicating the predetermined code (the code corresponding to key 500 operated by the user) in response to an operation performed by the user on key 500.

Figure 18:
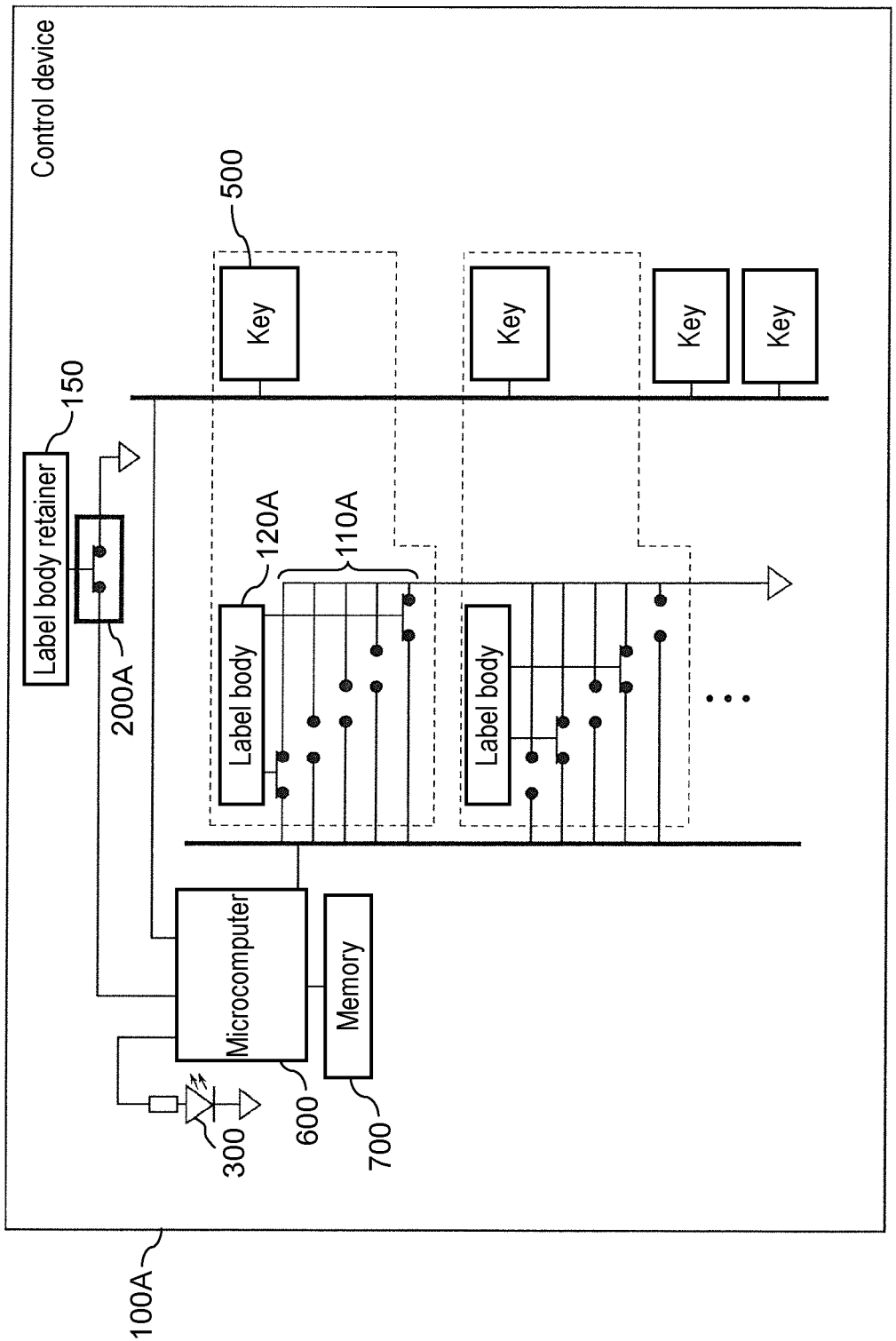
FIG. 18 is a block diagram illustrating one example of a configuration of the control device according to the third exemplary embodiment.

FIG. 18 is a block diagram illustrating an example of a configuration of control device 100A according to the third exemplary embodiment.

The block diagram of control device 100A illustrated in FIG. 18 in the present exemplary embodiment is substantially the same as the block diagram of control device 1100 illustrated in FIG. 8 in the first modification of the first exemplary embodiment. However, the block diagram of control device 100A in FIG. 18 is different in the following points from the block diagram of control device 1100 in FIG. 8. A single pin (corresponding to insertion detecting switch 200) used for detecting insertion of respective label bodies 120 in control device 1100 in the first modification of the first exemplary embodiment is used for one digit of the code corresponding to the function assigned to key 500 in control device 100A in the present exemplary embodiment. Therefore, in control device 100A in the present exemplary embodiment, a number of digits of the code can relatively be increased, whereby more kinds of functions (kinds of controls of the electronic device to be controlled) can be selected as functions to be assigned to key 500.

In control device 1100 in the first modification of the first exemplary embodiment, insertion detecting switch 200 for detecting whether label body 120 is mounted to control device 1100 (housing 900) is provided to each of a plurality of label bodies 120. However, in control device 100A in the present exemplary embodiment, functions of the plurality of insertion detecting switches 200 are converged into single label body retainer detecting switch 200A.

Specifically, in control device 100A in the present exemplary embodiment, single label body retainer detecting switch 200A detects whether label bodies 120A (for example, four label bodies 120A) in one row secured by single label body retainer 150 are attached to housing 900A of control apparatus 10A. Therefore, in control device 100A in the present exemplary embodiment, a number of contacts formed by switches is less than that in control device 1100 in the first modification of the first exemplary embodiment, whereby power consumption can be reduced. For example, if control device 100A is a part of a remote controller as described in the present exemplary embodiment, a battery drain can be suppressed due to this configuration, and thus, this configuration is highly useful.

Figure 19A:
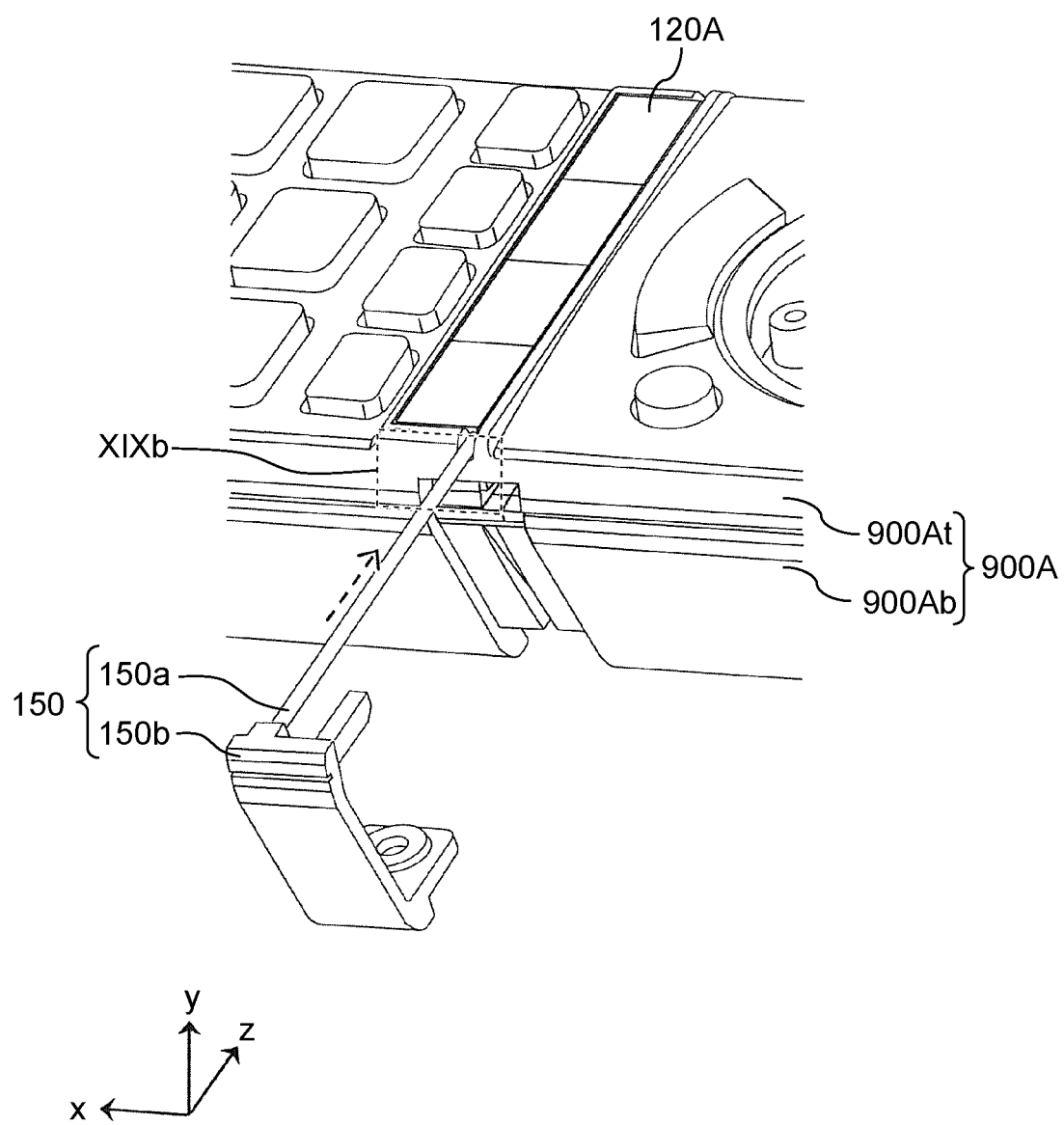
FIG. 19A is a view schematically illustrating a state where the label body retainer is used for another purpose in the control device according to the third exemplary embodiment.
Figure 19B:
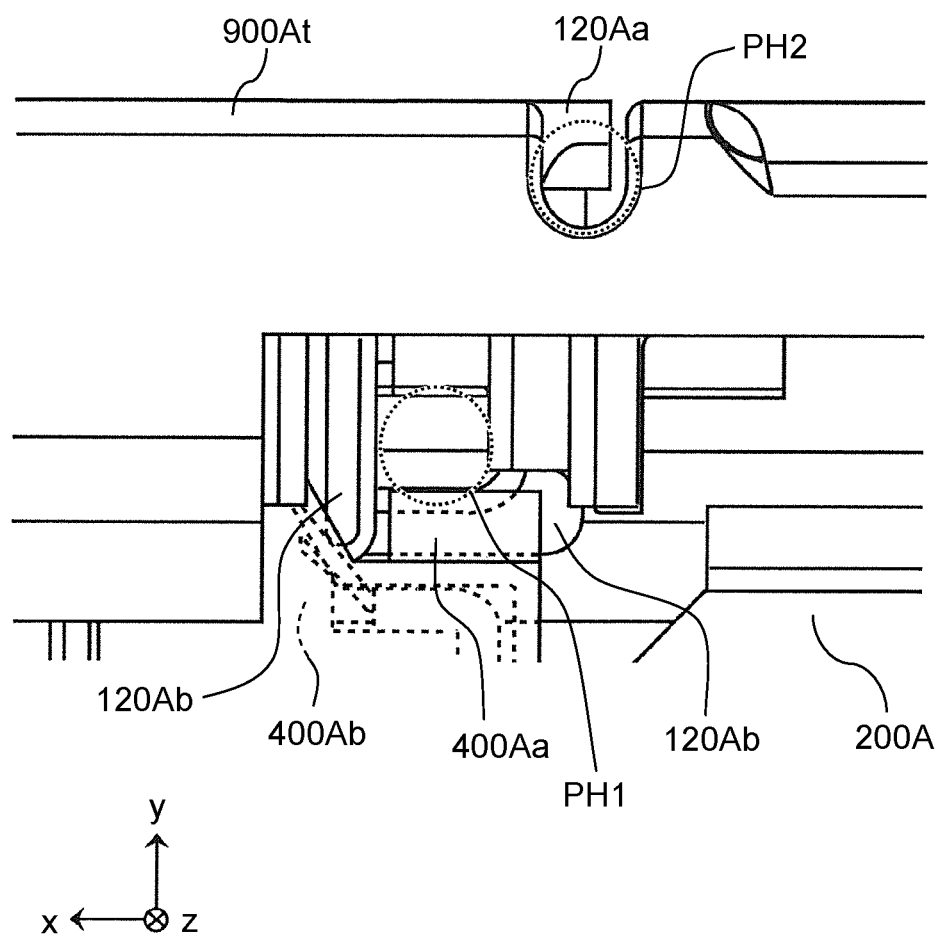
FIG. 19B is a view schematically illustrating one example of an insertion position when a through member of the label body retainer is inserted to the control device according to the third exemplary embodiment.

Label body retainer 150 may be configured to be usable for other purposes in addition to fixing label body 120A to housing 900A. Specifically, label body retainer 150 may be configured to be used as an instrument for removing label body 120A from housing 900A when label body 120A is exchanged. FIGS. 19A and 19B illustrate this configuration.

FIG. 19A is a view schematically illustrating a state where label body retainer 150 is used for another purpose in control device 100A according to the third exemplary embodiment.

FIG. 19A illustrates a state where label body retainer 150 removed from housing 900A is used as an instrument for removing label body 120A from housing 900A. In this case, through member 150a is inserted into a hole (a hole on the right side surface of housing 900A) formed in a position different from the position of the hole into which through member 150a is inserted to secure label body 120A. Two insertion positions when through member 150a of label body retainer 150 is inserted into control device 100A will be described below with reference to FIG. 19B.

FIG. 19B is a view schematically illustrating one example of insertion positions when through member 150a of label body retainer 150 is inserted into control device 100A according to the third exemplary embodiment. FIG. 19B illustrates region XIXb of control device 100A enclosed by a broken line in FIG. 19A as viewed in the direction indicated by a broken line arrow in FIG. 19A.

Position PH1 indicated by a broken line circle in FIG. 19B indicates the position into which through member 150a is inserted to secure label body 120A. When through member 150a is inserted into this position PH1, through member 150a penetrates through-holes 120Ac formed in ribs 120Ae provided on protruding parts 120Ab of label bodies 120A over rubber cap 400Aa, as described above.

Position PH2 indicated by a broken line circle in FIG. 19B indicates the position into which through member 150a is inserted when it is used as an instrument for removing label body 120A from housing 900A. Through member 150a is inserted into a gap between display part 120Aa of label body 120A and upper housing 900At from this position PH2.

For example, when through member 150a is inserted into position PH2, the user can push up (in the positive direction of the y axis) the lower surface of display part 120Aa at a portion near the tip of through member 150a. Thus, protruding part 120Ab displaces in the direction (positive direction of the y axis) in which it is removed from housing 900A. With this process, the user can easily remove label body 120A from housing 900A.

Alternatively, the shapes and arrangement positions of display part 120Aa and through member 150a may be set such that, when through member 150a is inserted into position PH2, a force for pushing up (positive direction of the y axis) the lower surface of display part 120Aa is applied to label body 120A from through member 150a. With this configuration, the user may not push up display part 120Aa by through member 150a. The user can displace protruding part 120Ab in the direction of removal from housing 900A only by inserting through member 150a into position PH2.

When protruding part 120Ab displaces in the direction of removal from housing 900A, label body 120A may be removed from housing 900A, or the displacement may be simply to raise label body 120A from housing 900A to allow the user to easily remove label body 120A.

In the configuration in which label body retainer 150 is used as the instrument for removing label body 120A from housing 900A, the material and shape of through member 150a are desirably selected to obtain rigidity suitable for the purpose described above.

In a case where an instrument for removing label body 120A from housing 900A is presented as a tool or accessory of control apparatus 10A, and such an instrument is stored in a box or storage furniture, the user is likely to have difficulty in finding the instrument or the instrument may be broken when the user intends to use the instrument. If a substitute such as a needle or nail is used as an instrument for removing label body 120A from housing 900A, such a substitute may sometimes be unsuitable for the instrument in view of the shape, size, or material thereof. In such a case, the substitute is likely to damage or scratch label body 120A or housing 900A.

However, in the present exemplary embodiment, through member 150a of label body retainer 150 is stored inside control device 100A as an instrument for securing label body 120A to housing 900A, when not being used as an instrument for removing label body 120A from housing 900A. Thus, loss or damage of through member 150a is prevented. In addition, the user can obtain an instrument for removing label body 120A from housing 900A only by withdrawing through member 150a from housing 900A, when removing label body 120A from housing 900A. Further, through member 150a is provided not only as an instrument for securing label body 120A to housing 900A but also as an instrument for removing label body 120A from housing 900A, whereby label body 120A can be removed from housing 900A while reducing a possibility of damage or scratch, which may be caused by the substitute, on components of control apparatus 10A.

[5-2. Other Examples]

FIGS. 15A to 15C illustrate the configuration example where through-hole 120Ac is formed in rib 120Ae provided separately from rib 120Ad used for the assignment of functions to key 500. However, the mode of through-hole 120Ac is not limited at all to the configuration example described above. Any mode is applied for through-hole 120Ac, as long as it allows through member 150a to be inserted therethrough to restrict displacement of protruding part 120Ab in the direction of removal of protruding part 120Ab, to thereby being capable of preventing label body 120A from dropping off from housing 900A. For example, in place of forming a hole in rib 120Ae and using this hole as through-hole 120Ac, through-hole 120Ac may be formed by attaching a ring-shaped member to protruding part 120Ab. Alternatively, if protruding part 120Ab has a certain thickness, a hole may be formed in protruding part 120Ab to be used as through-hole 120Ac, or a groove may be formed in protruding part 120Ab and this groove may be used in place of through-hole 120Ac.

The configuration of fixing label body retainer 150 to housing 900A is not limited to the above-mentioned configuration using a screw. For example, label body retainer 150 may be provided with a barbed hook, and label body retainer 150 may be fixed to housing 900A by inserting this hook into the hole in housing 900A. Alternatively, other various known configurations for detachably fixing a component may be used.

Note that label body retainer 150 may not be removable from housing 900A. For example, control device 100A may be configured such that label body retainer 150 can slide and displace on housing 900A. In addition, control device 100A may be configured to include a plurality of through members 150a which is inserted into and withdrawn from through-hole 120Ac in each label body 120A due to this displacement.

Although control device 100A includes, as one of components, label body retainer detecting switch 200A and insulating member 400A, they are optional components in the present disclosure. For example, while control device 100 described in the first exemplary embodiment does not include insertion detecting switch 200 and insulating member 400, label body 120 in control device 100 may be exchanged for label body 120A in the present exemplary embodiment and label body retainer 150 may be attached.

[5-3. Effects and Others]

As described above, in the present exemplary embodiment, the control device is a control device for controlling an electronic device and includes: an output unit that outputs a signal for prompting the electronic device to execute a predetermined operation; a function switch unit that includes a plurality of switches each having a contactor formed such that at least a portion of the contactor is elastically displaceable in a predetermined direction, the switches each being switched between an open state and a closed state due to displacement of the at least a portion of the contactor in the predetermined direction; and a label body that has a display part and a protruding part protruding from the display part, the label body being mounted in a state where the protruding part is inserted into a hole in a housing and the display part is positioned on an outside of the housing. The protruding part of the label body determines a combination of open or closed states of the plurality of switches switched when the protruding part presses and displaces at least one of the contactors of the plurality of switches in the predetermined direction. The predetermined operation is determined according to the combination.

Control device 100A is one example of the control device. The TV receiver is one example of the electronic device. Key 500 is one example of the operation unit. Output unit 300 is one example of the output unit. Movable contactor 110Aa is one example of the contactor. The switch composed of one movable contactor 110Aa and one fixed contactor 110Ab is one example of the switch that is switched between an open state and a closed state. Function switch unit 110A is one example of the function switch unit. Display part 120Aa is one example of the display part. Protruding part 120Ab is one example of the protruding part. Housing 900A is one example of the housing. Label body 120A is one example of the label body.

The control device (for example, control device 100A) thus configured enables the user to change the assignment of functions to the operation unit (for example, key 500) only by exchanging a plurality of label bodies (for example, label bodies 120A) for one another, as in control device 100 described in the first exemplary embodiment.

The control device may further include a label body retainer. The protruding part may have a through-hole extending in a direction intersecting a direction in which the protruding part is removed from the housing. The label body retainer may have a through member penetrating the through-hole.

Label body retainer 150 is one example of the label body retainer. Through-hole 120Ac is one example of the through-hole. Through member 150a is one example of the through member.

For example, in the example described in the third exemplary embodiment, control device 100A for controlling the electronic device further includes label body retainer 150. Protruding part 120Ab has through-hole 120Ac extending in a direction intersecting a direction in which protruding part 120Ab is removed from housing 900A. Label body retainer 150 has through member 150a penetrating through-hole 120Ac.

In the control device (for example, control device 100A) thus configured, displacement of protruding part 120Ab in the direction in which protruding part 120Ab is removed from housing 900A is restricted by through member 150a, whereby label body 120A is prevented from dropping off from control device 100A.

In the control device, the label body retainer may be removable from the housing. The through member may be inserted into a gap between the display part and the housing with the label body being mounted to the control device to thereby displace the protruding part in the direction in which the protruding part is removed, when the label body retainer is detached from the housing.

For example, in the example described in the third exemplary embodiment, label body retainer 150 is removable from housing 900A in control device 100A. Through member 150a is inserted into a gap between display part 120Aa and housing 900A with label body 120A being mounted to control device 100A to thereby displace protruding part 120Ab in the direction in which protruding part 120Ab is removed, when label body retainer 150 is detached from housing 900A.

In the control device (for example, control device 100A) thus configured, label body retainer 150 can be used as an instrument for removing label body 120A from housing 900A.

The control device may further include an operation unit and a label body retainer detecting switch that is a switch switched between an open state and a closed state due to displacement of at least a portion of the label body retainer detecting switch when being pressed by the label body retainer fixed to the housing. The output unit may output a signal for prompting the electronic device to execute the predetermined operation in response to an operation of the operation unit when the label body retainer detecting switch is in one state of the open state and the closed state, and the output unit may not output the signal in response to the operation of the operation unit when the label body retainer detecting switch is in the other state of the open state and the closed state.

Key 500 is one example of the operation unit. Label body retainer detecting switch 200A is one example of the label body retainer detecting switch.

For example, in the example described in the third exemplary embodiment, control device 100A for controlling an electronic device includes key 500 and label body retainer detecting switch 200A that is switched between an open state and a closed state due to displacement of at least a portion of label body retainer detecting switch 200A when being pressed by label body retainer 150 fixed to housing 900A. Output unit 300 outputs the signal for prompting the electronic device to be controlled to execute a predetermined operation in response to the operation performed on key 500 by the user, when label body retainer detecting switch 200A is in the closed state, for example. On the other hand, output unit 300 does not output the signal in response to the operation performed on key 500 by the user, when label body retainer detecting switch 200A is in the open state, for example.

In the control device (for example, control device 100A) thus configured, only when label body 120A is appropriately mounted to the mounting position and label body 120A is appropriately secured by label body retainer 150, a signal for prompting the electronic device to be controlled to execute the predetermined operation is output from output unit 300 in response to the operation (depression) performed by user on key 500. Accordingly, this configuration can prevent the electronic device to be controlled from executing an operation unintended by the user using control apparatus 10A.

Other Exemplary Embodiments

The first, second, and third exemplary embodiments and the modifications of the respective exemplary embodiments have been described above as illustrations of the technique disclosed in the present application. However, the technique in the present disclosure is not limited thereto, and can also be applied to exemplary embodiments subjected to alteration, substitution, addition, omission and the like. In addition, a new exemplary embodiment can be made by combining the respective constituents described in the above first to third exemplary embodiments and the modifications of the exemplary embodiments.

Therefore, other exemplary embodiments and their modifications which have not been described in the above exemplary embodiments will be described below.

In the above first, second, and third exemplary embodiments and the modifications of the exemplary embodiments, the control device is described as a part of the control apparatus which is a remote controller. In this case, the control device is implemented as a region that can be customized by the user in the remote controller, for example. This region includes any number of keys. For example, this region may include a single key or two or more keys. In addition, the control device in the present disclosure may be implemented as a remote controller as a whole such that all keys in the remote controller can be exchanged for one another, for example.

Figure 20:
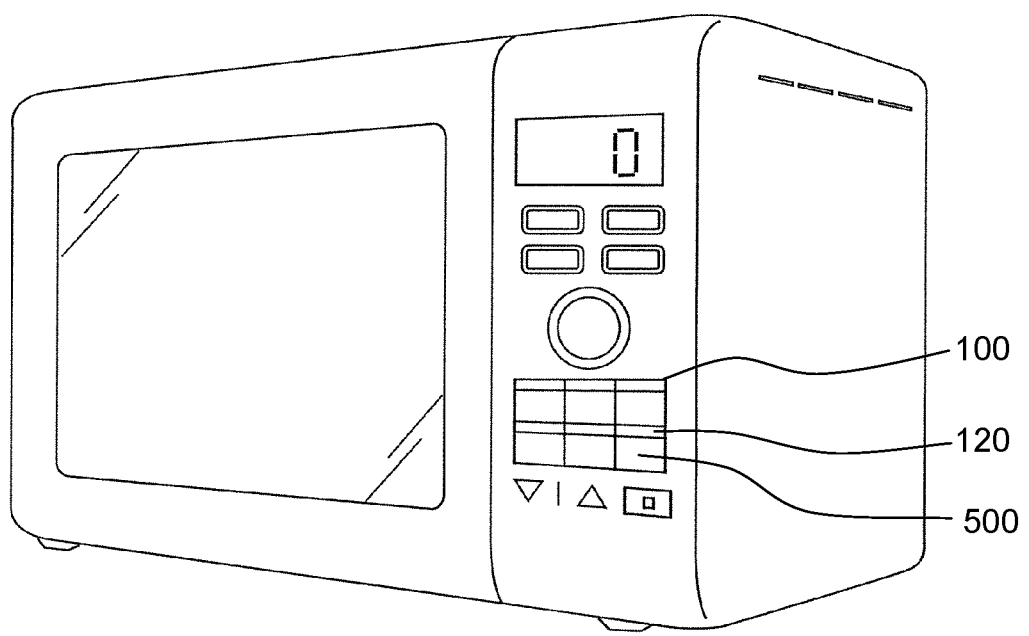
FIG. 20 is a view schematically illustrating one example of an appearance of a control device according to another exemplary embodiment.

Further, the control device in the present disclosure may be implemented as an operation panel provided to the electronic device to be controlled. FIG. 20 illustrates one example of such an exemplary embodiment. FIG. 20 is a view schematically illustrating one example of an appearance of a control device according to another exemplary embodiment. In the example in FIG. 20, a microwave has control device 100 on an operation panel, and control device 100 includes a plurality of keys 500 and label bodies 120 corresponding to respective keys 500. Keys 500 and label bodies 120 are disposed on a front surface of the microwave. In this configuration, output unit 300 is not an infrared-emitting diode as described above but a signal line transmitting a control signal.

If the control device is a part of a control apparatus or an electronic device in variations of another exemplary embodiment, output unit 300, housing 900, microcomputer 600, and memory 700 described above may be respectively implemented as a part of an output unit, a housing, a control unit, and a storage device which are components of the control apparatus or the electronic device.

The control device according to the present disclosure or the control apparatus including the control device according to the present disclosure is not limited to the one configured as a remote controller of an electronic device which is wirelessly operated. The control device according to the present disclosure or the control apparatus including the control device according to the present disclosure may be configured to output a control signal to an electronic device from a control apparatus, which is connected by wire, through a signal line of the control apparatus.

In a case where the control device in the present disclosure is implemented as a remote controller as a whole or a part of a remote controller, output unit 300 is not limited to an infrared-emitting diode. Output unit 300 may be configured to be capable of outputting a wireless signal, such as radio waves, used in wireless communication. Specifically, output unit 300 may output electromagnetic waves other than infrared light for transmitting a signal for prompting the electronic device to be controlled to execute the predetermined operation. Output unit 300 may output a signal conforming to a communication system such as Bluetooth (registered trademark) or ZigBee (registered trademark). Due to this configuration, the control device according to the present disclosure or the control apparatus including the control device according to the present disclosure can function as a remote controller.

In the above exemplary embodiments, a key which is operated when being pressed by the user is described as one example of the operation unit. However, the operation unit is not limited to the key in the present disclosure. The operation unit may be any kinds of switches operated by the user.

The shape of the protruding part protruding from the label body is not limited to the shape described and illustrated in the above exemplary embodiments. The protruding part may have a shape enabling a switch to be switched between an open state and a closed state when the label body is mounted to the control device. For example, in the first exemplary embodiment, label body 120 may have one or more protruding parts for pressing movable contactor 110a, in place of protruding part 120b having one or more ribs 120c for pressing movable contactor 110a. The number of ribs provided to the label body, the number of the protruding parts, or the number of movable contactors 110a described and illustrated in the above exemplary embodiments are merely one example, and these numbers may assume other values.

The above exemplary embodiments have described that the operation unit and the label body are different components and the label body is not an object to be operated by the user. However, the present disclosure is not limited at all to this configuration. For example, a function assigned to an operation unit may be displayed on a front face (a face seen and touched by the user) of the operation unit (that is, the display part of the label body is integral with the front face of the operation unit), and a configuration (that is, a configuration similar to the protruding part of the label body) for determining the function assigned to the operation unit may be provided to the back face of the operation unit. Alternatively, the label body may be mounted to the operation unit, not to the housing of the control device, and the operation unit and the label body may integrally move by the operation performed by the user on the operation unit. For example, the operation unit and the label body may be pressed together by the user.

Although an example of a configuration in which the operation unit and the label body have a one-to-one relationship has been described in the above exemplary embodiments, the present disclosure is not limited at all to this configuration. For example, a single label body may correspond to a plurality of operation units. That is, a single label body may correspond to a plurality of keys. This configuration example will be described, taking a remote controller of a TV receiver as one example. It is supposed that this remote controller has keys (for example, keys for operations such as an operation for starting a video recorder, an operation for playing a video, and an operation for pausing a video) for operating the video recorder connected to the TV receiver, the keys being collectively disposed in one location, and a label body having a display of "external device" is provided near the location where these keys are disposed. When this label body is exchanged for a label body having a display of a certain video site on the Internet, a key disposed in this region is changed to a key for operating the video site from a key for operating the video recorder. Specifically, the user can start (display) the video site, play the video, and pause the video by operating these keys, for example. As described above, the control device may be configured such that the functions of a plurality of operation units are simultaneously changed only by exchanging one label body.

The above exemplary embodiments have described that a switch including a pair of movable contactor and fixed contactor is used as the switch included in the function switch unit. However, the present disclosure is not limited at all to this configuration. The switch included in the function switch unit in the present disclosure may be a switch that is switched between an open state and a closed state when the label body is mounted to the control device. For example, a switch which has two movable contactors and is in a closed state in an initial state may be used as the switch included in the function switch unit. The function switch unit may be configured such that the protruding part protruding from the label body mounted to the control device makes the contact of the two movable contactors open to bring the switch into an open state.

The above exemplary embodiments have described a configuration in which the control device includes a microcomputer serving as a control unit and a memory serving as a storage, and the microcomputer converts a combination of open or closed states of the function switch unit into a code and causes the output unit to transmit the code as a signal. However, in the present disclosure, the configuration for prompting the electronic device to execute different operations according to the combination of open or closed states is not limited to this configuration. For example, the control device may be configured such that the respective switches in the function switch unit are connected to different output lines, and when the label body is exchanged, the output line outputting a signal is changed. In this configuration, the control unit and the storage are not necessary for the control device.

In the above exemplary embodiments, microcomputer 600 has been described as one example of the control unit. The operation executed by the control unit in the present disclosure may be implemented such that a computer program created for executing the operations described in the exemplary embodiments is executed by microcomputer 600, or may be implemented by an electric circuit or a semiconductor integrated circuit configured to execute the operations described in the exemplary embodiments.

As described above, the exemplary embodiments have been described as an example of the technique according to the present disclosure. The accompanying drawings and the detailed description have been provided for this purpose.

Accordingly, the constituent elements described in the accompanying drawings and the detailed description may include not only constituent elements that are essential to solve the problem but also constituent elements that are provided as examples used to exemplify the technique and are not essential to solve the problem. It should not be therefore determined that the unessential constituent elements in the accompanying drawings and the detailed description are essential only based on the fact that these constituent elements are included in the drawings and the description.

The above exemplary embodiments are provided to exemplify the technique according to the present disclosure, and thus various changes, replacements, additions, omissions, and the like can be made within the scope of the claims and equivalents thereof.

INDUSTRIAL APPLICABILITY

The present disclosure is applicable to a control apparatus. Specifically, the present disclosure is applicable to a remote controller for controlling an electronic device and an operation panel provided to the electronic device.

REFERENCE MARKS IN THE DRAWINGS 10, 10A: control apparatus
100, 100A, 1100, 2100: control device
110A, 110, 111, 112, 113, 114, 1110: function switch unit
110Aa, 110a, 111a, 112a, 113a, 114a, 1110a, 1110aR, 1110aL: movable contactor
110Ab, 110b, 111b, 112b, 113b, 114b, 1110b, 1110bR, 1110bL: fixed contactor
120, 120A, 121, 122, 123, 124, 125, 126, 127, 128, 129, 1120: label body
120Aa, 120a, 121a, 122a, 123a, 124a, 125a, 126a, 127a, 128a, 1120a: display part
120Ab, 120b, 121b, 122b, 123b, 124b, 125b, 126b, 127b, 128b, 1120b: protruding part
120Ac: through-hole
120c, 121c, 122c, 123c, 124c, 120Ad, 120Ae: rib
120d, 121d, 122d, 123d, 124d, 120Af: recess
150: label body retainer
150a: through member
150b: fixing part
200, 201, 202, 204: insertion detecting switch
200A: label body retainer detecting switch
200c, 201c, 202c, 203c, 204c: insertion detecting switch cover
202a: movable contactor
202b: fixed contactor
300: output unit
400, 400A: insulating member
400Aa, 400a: rubber cap
400Ab, 400b: housing
500, 501, 502, 503, 504, 505, 506, 507, 508: key
600: microcomputer
700: memory
800, 800A: substrate
900, 900A: housing
910: hole
950: protruding part

The invention claimed is:

1. A control device for controlling an electronic device, the control device comprising:
   an output unit that outputs a signal for prompting the electronic device to execute a predetermined operation;
   a function switch unit that includes a plurality of switches each having a contactor formed such that at least a portion of the contactor is elastically displaceable in a predetermined direction, the switches each being switched between an open state and a closed state due to displacement of the at least a portion of the contactor in the predetermined direction; and a label body that has a display part and a protruding part protruding from the display part, the label body being mounted in a state where the protruding part is inserted into a hole in a housing and the display part is positioned on an outside of the housing, wherein the protruding part of the label body determines a combination of open or closed states of the plurality of switches switched when the protruding part presses and displaces at least one of the contactors of the plurality of switches in the predetermined direction, the predetermined operation is determined according to the combination, the predetermined direction is substantially perpendicular to a direction in which the protruding part is inserted, and the protruding part presses and displaces the at least a portion of the contactor by a part of the protruding part other than a tip of the protruding part, when the label body is mounted to the control device.

2. The control device according to claim 1, wherein
the predetermined direction is substantially same as a direction in which the protruding part is inserted, and
the protruding part presses and displaces the at least a portion of the contactor by a tip of the protruding part, when the label body is mounted to the control device.

3. The control device according to claim 1, further comprising a first insulating member that electrically isolates the label body from the function switch unit,
wherein the first insulating member is pressed by the protruding part and at least a partial area of the first insulating member elastically displaces in the predetermined direction, and the protruding part presses and displaces the at least one of the contactors of the plurality of switches in the predetermined direction, due to the displacement of the at least partial area.

4. The control device according to claim 3, further comprising a second insulating member that separates the plurality of switches from one another,
wherein the second insulating member presses the first insulating member pressed by the protruding part with a force in a direction opposite to the predetermined direction to restrict a size of an area pressed and displaced by the protruding part in the first insulating member.

5. The control device according to claim 1, further comprising a label body retainer, wherein
the protruding part has a through-hole extending in a direction intersecting a direction in which the protruding part is removed from the housing, and
the label body retainer has a through member penetrating the through-hole.

6. The control device according to claim 5, wherein
the label body retainer is removable from the housing, and the through member is inserted into a gap between the display part and the housing, while the label body is mounted to the control device, to displace the protruding part in the direction in which the protruding part is removed, when the label body retainer is detached from the housing.

7. The control device according to claim 1, further comprising:
an operation unit; and
an insertion detecting switch that is a switch switched between an open state and a closed state due to displacement of at least a portion of the insertion detecting switch when being pressed by the protruding part,
wherein the output unit outputs the signal in response to an operation of the operation unit when the insertion detecting switch is in one state of the open state and the closed state, and the output unit does not output the signal in response to the operation of the operation unit when the insertion detecting switch is in the other state of the open state and the closed state.

8. The control device according to claim 6, further comprising:
an operation unit; and
a label body retainer detecting switch that is a switch switched between an open state and a closed state due to displacement of at least a portion of the label body retainer detecting switch when being pressed by the label body retainer fixed to the housing,
wherein the output unit outputs the signal in response to an operation of the operation unit when the label body retainer detecting switch is in one state of the open state and the closed state, and the output unit does not output the signal in response to the operation of the operation unit when the label body retainer detecting switch is in the other state of the open state and the closed state.

9. The control device according to claim 1, further comprising:
an operation unit;
a control unit electrically connected to the operation unit, the plurality of switches, and the output unit; and
a storage connected to the control unit, wherein
the storage stores the combination and a code in association with each other, the code being for prompting the electronic device to execute the predetermined operation, and
when detecting an operation of the operation unit, the control unit detects the combination of the open or closed states of the plurality of switches, acquires a code associated with the detected combination from the storage, and causes the output unit to output the acquired code as the signal.

* * * * *